(12) United States Patent
Shin et al.

(10) Patent No.: US 10,885,295 B2
(45) Date of Patent: Jan. 5, 2021

(54) FINGERPRINT INFORMATION PROCESSING METHOD AND ELECTRONIC DEVICE SUPPORTING THE SAME

(71) Applicant: Samsung Electronics Co., Ltd., Gyeonggi-do (KR)

(72) Inventors: Dae Kyu Shin, Gyeonggi-do (KR); Hyung Suk Kim, Gyeonggi-do (KR); Hee Kuk Lee, Gyeonggi-do (KR); Yu Min Jung, Gyeonggi-do (KR); Hyeong Wook Yang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 1 day.

(21) Appl. No.: 15/970,197

(22) Filed: May 3, 2018

(65) Prior Publication Data

US 2018/0253586 A1    Sep. 6, 2018

Related U.S. Application Data

(63) Continuation of application No. 15/077,219, filed on Mar. 22, 2016, now abandoned.

(30) Foreign Application Priority Data

Apr. 29, 2015    (KR) .......................... 10-2015-0060950

(51) Int. Cl.
   *G06K 9/00*    (2006.01)
   *G06F 21/31*   (2013.01)
   (Continued)

(52) U.S. Cl.
   CPC ......... *G06K 9/00013* (2013.01); *G06F 21/32* (2013.01); *G06K 9/00067* (2013.01);
   (Continued)

(58) Field of Classification Search
   CPC ........ G06F 21/32; G06F 21/31; G06F 3/0481; G06K 9/00073; G06K 9/00006;
   (Continued)

(56) References Cited

U.S. PATENT DOCUMENTS 7,190,816 B2    3/2007   Mitsuyu et al.
7,194,116 B2    3/2007   Du et al.
(Continued)

FOREIGN PATENT DOCUMENTS

EP    1 353 291         7/2009
KR    1020100127432     12/2010
(Continued)

OTHER PUBLICATIONS

International Search Report dated Jun. 21, 2016 issued in counterpart application No. PCT/KR2016/002673, 10 pages.

(Continued)

*Primary Examiner* — Kenny A Cese
(74) *Attorney, Agent, or Firm* — The Farrell Law Firm, P.C.

(57) ABSTRACT

Methods and electronic devices are provided in which first fingerprint information of a first portion of the user's fingerprint is obtained upon the user's fingerprint contacting the fingerprint sensor. A display object is output within a target area for the fingerprint registration, in response to obtaining the first fingerprint information. A guiding object is output to guide contact of a next portion of the user's fingerprint that is adjacent to the first portion. Next fingerprint information of the next portion of the user's fingerprint is obtained upon the user's fingerprint contacting the fingerprint sensor guided by the guiding object. Upon modifying the display object based on the obtained next fingerprint information, the steps of outputting a guiding object and obtaining a next fingerprint information are repeated (Continued)

until fingerprint information at least partially surrounding the first portion is obtained.

16 Claims, 13 Drawing Sheets

(51) Int. Cl.
  *G06F 21/32* (2013.01)
  *G06F 3/0481* (2013.01)
(52) U.S. Cl.
  CPC ........ *G06K 9/00087* (2013.01); *G06F 3/0481* (2013.01); *G06F 21/31* (2013.01); *G06K 9/00006* (2013.01); *G06K 9/0008* (2013.01); *G06K 9/00073* (2013.01)
(58) Field of Classification Search
  CPC ............. G06K 9/0008; G06K 9/00013; G06K 9/00067; G06K 9/00087
  See application file for complete search history.

(56) References Cited

U.S. PATENT DOCUMENTS

| | | |
|---|---|---|
| 7,212,658 B2 | 5/2007 | Du et al. |
| 8,045,767 B2 | 10/2011 | Du et al. |
| 8,810,367 B2 | 8/2014 | Mullins |
| 8,834,264 B2 | 9/2014 | Dabrowski |
| 8,913,801 B2 | 12/2014 | Han et al. |
| 8,913,802 B2 | 12/2014 | Han et al. |
| 8,942,437 B2 | 1/2015 | Schneider et al. |
| 9,033,794 B2 | 5/2015 | Dabrowski |
| 9,202,099 B2 | 12/2015 | Han et al. |
| 2002/0141622 A1 | 10/2002 | Yamaguchi |
| 2003/0194114 A1 | 10/2003 | Mitsuyu et al. |
| 2005/0238211 A1 | 10/2005 | Du et al. |
| 2005/0238212 A1 | 10/2005 | Du et al. |
| 2007/0225074 A1 | 9/2007 | Dabrowski |
| 2010/0303311 A1 | 12/2010 | Shin et al. |
| 2011/0038513 A1 | 2/2011 | Du et al. |
| 2011/0279664 A1 | 11/2011 | Schneider et al. |
| 2012/0250954 A1 | 10/2012 | Nada |
| 2012/0327009 A1 | 12/2012 | Fleizach |
| 2013/0076485 A1 | 3/2013 | Mullins |
| 2013/0259330 A1 | 10/2013 | Russo |
| 2013/0272586 A1 | 10/2013 | Russo |
| 2014/0003677 A1 | 1/2014 | Han et al. |
| 2014/0003679 A1 | 1/2014 | Han et al. |
| 2014/0212010 A1 | 7/2014 | Han et al. |
| 2014/0301614 A1 | 10/2014 | Han et al. |
| 2014/0359757 A1 | 12/2014 | Sezan |
| 2015/0005058 A1 | 1/2015 | Dabrowski |
| 2015/0074418 A1 | 3/2015 | Lee et al. |
| 2015/0074615 A1* | 3/2015 | Han ................ H04L 63/105 715/863 |
| 2015/0131876 A1* | 5/2015 | Chang ............... G06F 3/0488 382/124 |
| 2015/0139512 A1 | 5/2015 | Han et al. |
| 2015/0146945 A1 | 5/2015 | Han et al. |
| 2015/0317875 A1 | 11/2015 | Dabrowski |
| 2017/0275800 A1 | 9/2017 | Kim |

FOREIGN PATENT DOCUMENTS

| | | |
|---|---|---|
| KR | 1020150018349 | 2/2015 |
| WO | WO 2016/036034 | 3/2016 |

OTHER PUBLICATIONS

European Search Report dated Sep. 26, 2016 issued in counterpart application No. 16167648.1-1870, 7 pages.

* cited by examiner

FINGERPRINT INFORMATION PROCESSING METHOD AND ELECTRONIC DEVICE SUPPORTING THE SAME

PRIORITY

This application is a Continuation Application of U.S. application Ser. No. 15/077,219, filed in the U.S. Patent and Trademark Office on Mar. 22, 2016, which claims priority under 35 U.S.C. § 119(a) to Korean Patent Application Serial No. 10-2015-0060950 filed in the Korean Intellectual Property Office on Apr. 29, 2015, the entire disclosure of which is incorporated herein by reference.

BACKGROUND

1. Field of the Disclosure

The present disclosure relates generally to fingerprint information processing, and more particularly, to a method and apparatus for fingerprint information processing based on adjacent target fingerprint areas.

2. Description of Related Art

Recently, interest in security, such as private information protection and user authentication has increased. Accordingly, a demand for development of electronic devices that support security and related technologies has also increased. In particular, electronic devices have become users' essential belongings, such as mobile devices including smartphones, and user authentication has become an important function. Techniques relating to user authentication are actively being developed.

In relation to user authentication techniques, fingerprint recognition is included in various common technologies. In relation to fingerprint recognition, which authenticates a user based on a user's fingerprint, an electronic device that performs fingerprint recognition may authenticate a user by comparing fingerprint information collected during user authentication with fingerprint information registered through a fingerprint registration process.

In order to perform fingerprint authentication, a line scan fingerprint sensor, for example, may be used to collect fingerprint information through a swipe method, or an area scan fingerprint sensor may collect fingerprint information through a touch method. When an area scan fingerprint sensor is mounted on a mobile device such as a smartphone, due to the characteristics of a mobile device, the size of a fingerprint sensor may be relatively smaller than a size of a finger to be scanned.

An electronic device having a fingerprint sensor that is smaller than a finger may repeatedly perform a fingerprint information collecting process several times in order to increase a finger recognition rate. However, according to existing fingerprint registration processes, even when a fingerprint information collecting process is performed several times, each fingerprint information collecting process may not be linked to a previous fingerprint information collecting process and may be performed separately. Additionally, according to an existing fingerprint registering method, a fingerprint area to be registered is not evenly extracted and may be extracted in a restricted manner based on a specific point (e.g., the core point of a knuckle). Accordingly, when using existing fingerprint registration methods, fingerprint information corresponding to the same or similar fingerprint area may be unnecessarily collected.

SUMMARY

The present disclosure is made to address at least the above-mentioned problems and/or disadvantages and to provide at least the advantages described below.

Accordingly, an aspect of the present disclosure provides a fingerprint information processing method for providing a method of inputting fingerprint information corresponding to a subject area in order to collect fingerprint information based on fingerprint information corresponding to a collected reference area during a fingerprint registration process and an electronic device supporting the same.

Another aspect of the present disclosure provides a fingerprint information processing method for combining a swipe method and a touch method and providing the combined one as a fingerprint information collecting method and an electronic device supporting the same.

Another aspect of the present disclosure provides a fingerprint information processing method for feeding back a fingerprint registration state by displaying at least one of collected fingerprint information and registered fingerprint information and an electronic device supporting the same.

In accordance with an aspect of the present disclosure, an electronic device is provided that includes a display, a fingerprint sensor configured to sense a user's fingerprint, and a processor coupled to the fingerprint sensor and configured to perform fingerprint registration. First fingerprint information of a first portion of the user's fingerprint is obtained via the fingerprint sensor upon the user's fingerprint contacting the fingerprint sensor. A first display object is output to the display in a target area for fingerprint registration, in response to obtaining the first fingerprint information of the first portion of the user's fingerprint. A first guiding object is output to the display to guide contact of a second portion of the user's fingerprint that is adjacent to the first portion. Second fingerprint information is obtained via the fingerprint sensor upon the user's fingerprint contacting the fingerprint sensor guided by the first guiding object. A second guiding object is output to display to guide contact of a third portion of the user's fingerprint that is adjacent to the first portion and the second portion. Third fingerprint information is obtained via the fingerprint sensor upon the user's fingerprint contacting the fingerprint sensor guided by the second guiding object. A third guiding object is output to the display to guide contact of a fourth portion of the user's fingerprint that is adjacent to the first portion and the third portion. Fourth fingerprint information is obtained via the fingerprint sensor upon the user's fingerprint contacting the fingerprint sensor guided by the third guiding object. The contact of the second portion, the third portion, and the fourth portion of the user's fingerprint is guided in a predetermined order.

According to another aspect of the present disclosure, an electronic device is provided that includes a display, a fingerprint sensor configured to sense a user's fingerprint, and a processor coupled to the fingerprint sensor and configured to perform a fingerprint registration. First fingerprint information of a first portion of the user's fingerprint is obtained via the fingerprint sensor upon the user's fingerprint contacting the fingerprint sensor. A display object is output to the display within a target area for the fingerprint registration, in response to obtaining the first fingerprint information. A guiding object is output to the display to guide contact of a next portion of the user's fingerprint that is adjacent to the first portion. Next fingerprint information of the next portion of the user's fingerprint is obtained via the fingerprint sensor upon the user's fingerprint contacting the fingerprint sensor guided by the guiding object. Upon modifying the display object based on the obtained next fingerprint information, the steps of outputting a guiding object and obtaining a next fingerprint information are repeated until fingerprint information at least partially surrounding the first portion is obtained.

According to another aspect of the present disclosure, a fingerprint information processing method of an electronic device is provided. First fingerprint information of a first portion of the user's fingerprint is obtained via a fingerprint sensor of the electronic device upon the user's fingerprint contacting the fingerprint sensor. A first display object is output to a display of the electronic device in a target area for fingerprint registration, in response to obtaining the fingerprint information of the first portion of the user's fingerprint. A first guiding object is output to display to guide contact of a second portion of the user's fingerprint that is adjacent to the first portion. Second fingerprint information is obtained via the fingerprint sensor upon the user's fingerprint contacting the fingerprint sensor guided by the first guiding object. A second guiding object is output to the display to guide contact of a third portion of the user's fingerprint that is adjacent to the first portion. Third fingerprint information is obtained via the fingerprint sensor upon the user's fingerprint contacting the fingerprint sensor guided by the second guiding object. A third guiding object is output to the display to guide contact of a fourth portion of the user's fingerprint that is adjacent to the first portion. Fourth fingerprint information is obtained via the fingerprint sensor upon the user's fingerprint contacting the fingerprint sensor guided by the third guiding object. The contact of the second portion, the third portion, and the fourth portion of the user's fingerprint is guided in a predetermined order at least partially around the first portion of the user's fingerprint.

According to another aspect of the present disclosure, a fingerprint information processing method of an electronic device is provided. First fingerprint information of a first portion of the user's fingerprint is obtained via a fingerprint sensor of the electronic device upon the user's fingerprint contacting the fingerprint sensor. A display object is output to a display of the electronic device within a target area for the fingerprint registration, in response to obtaining the first fingerprint information. A guiding object is output to the display to guide contact of a next portion of the user's fingerprint that is adjacent to the first portion. Next fingerprint information of the next portion of the user's fingerprint is obtained via the fingerprint sensor upon the user's fingerprint contacting the fingerprint sensor guided by the guiding object. Upon modifying the display object based on the obtained next fingerprint information, the steps of outputting a guiding object and obtaining a next fingerprint information are repeated until fingerprint information at least partially surrounding the first portion is obtained.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
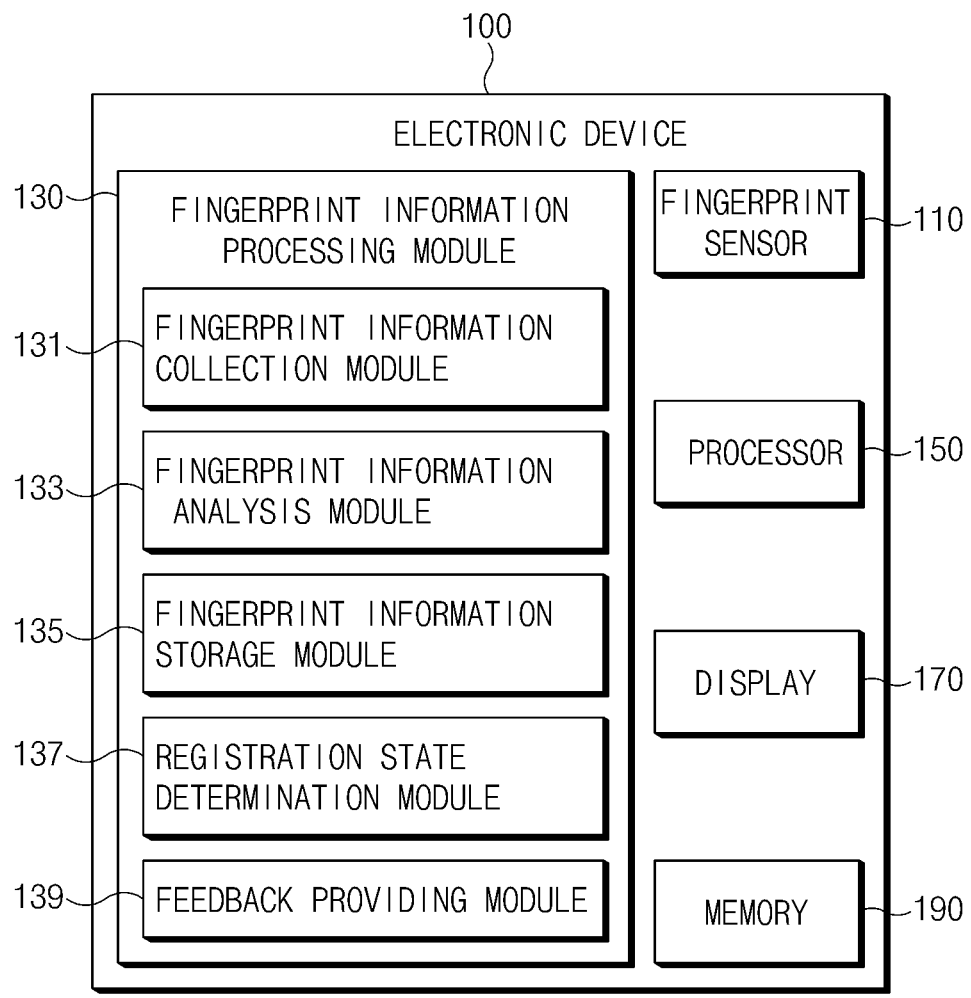
FIG. 1 is a diagram illustrating an electronic device relating to fingerprint information processing according to an embodiment of the present disclosure.

Hereinafter, various embodiments of the present disclosure are described with reference to the accompanying drawings. However, these descriptions do not limit the present disclosure to the specifically-described embodiments, and the present disclosure covers all the modifications, equivalents, and/or alternatives of this disclosure provided they come within the scope of the appended claims and their equivalents. With respect to the descriptions of the drawings, like reference numerals refer to like elements.

The terms "include," "comprise," "have", "may include," "may comprise", and "may have", as used herein, indicate disclosed functions, operations, or existence of elements but do not exclude other functions, operations or elements.

For instance, the expressions "A or B", and "at least one of A or/and B" may indicate the inclusion of A, B, both A and B, at least one A, at least one B, or both at least one A and at least one B.

Terms such as "1st", "2nd", "first", "second", and the like, as used herein, may modify various different elements of various embodiments of the present disclosure, but do not limit the elements. For example, "a first user device" and "a second user device" may indicate different user devices, regardless of the order or the importance. A first component may be referred to as a second component and vice versa without departing from the scope of the present disclosure.

When a first component is referred to as being "(operatively or communicatively) coupled with/to" or "connected to" a second component, the first component may be directly connected to the second component or connected through another component (e.g., a third component). When a first component is referred to as being "directly connected to" or "directly accessing" a second component, another component (e.g., a third component) does not exist between the first component and the second component.

The expression "configured to" may be interchangeably used with "suitable for", "having the capacity to", "designed to", "adapted to", "made to", or "capable of" according to context. The term "configured to" may not necessarily mean "specifically designed to" in terms of hardware. Instead, the expression "a device configured to" in some situations may mean that the device and another device or part are "capable of". For example, "a processor configured (or set) to perform A, B, and C" may mean a dedicated processor (e.g., an embedded processor) for performing a corresponding operation or a generic-purpose processor (e.g., a CPU or application processor) for performing corresponding operations by executing at least one software program stored in a memory device.

According to embodiments of the present disclosure, electronic devices may include at least one of, for example, smartphones, tablet personal computers (PCs), mobile phones, video phones, electronic book (e-book) readers, desktop personal computers (PCs), laptop personal computers (PCs), netbook computers, workstation server, personal digital assistants (PDAs), portable multimedia player (PMPs), MP3 players, mobile medical devices, cameras, and wearable devices. According to various embodiments of the present disclosure, the wearable devices may include at least one of, for example, accessory types (e.g., watches, rings, bracelets, anklets, necklaces, glasses, contact lenses, or head-mounted-devices (HMDs)), fabric or garment integrated types (for example, e-apparel), body-mounted types (for example, skin pads or tattoos), or bio-implantation types (for example, implantable circuits).

According to embodiments of the present disclosure, an electronic device may be home appliance. The home appliance may include at least one of, for example, televisions, digital video disk (DVD) players, audios, refrigerators, air conditioners, cleaners, ovens, microwave ovens, washing machines, air cleaners, set-top boxes, home automation control panels, security control panels, TV boxes, game consoles, electronic dictionaries, electronic keys, camcorders, and electronic picture frames.

According to embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global navigation satellite system (GNSS), event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller machines (ATMs), or point of sales (POS) devices or Internet of Things (IoT) devices (for example, light bulbs, various sensors, electric or gas meters, sprinkler systems, fire alarms, thermostats, street lights, toasters, exercise equipment, hot water tanks, heaters, boilers, etc.).

According to embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to embodiments of the present disclosure may be any one of the above-mentioned various devices or a combination thereof. An electronic device may be a flexible electronic device. Electronic devices according to embodiments of the present disclosure are not limited to the above-mentioned devices and may include a new kind of an electronic device according to technological developments.

Hereinafter, electronic devices according to embodiments of the present disclosure are described with reference to the accompanying drawings. Herein, the term "user" may refer to a person using an electronic device or a device using an electronic device (e.g., an artificial intelligence electronic device).

FIG. 1 is a diagram illustrating an electronic device relating to fingerprint information processing according to an embodiment of the present disclosure.

Referring to FIG. 1, an electronic device 100 includes a fingerprint sensor 110, a fingerprint information processing module 130, a processor 150, a display 170, and a memory 190. The fingerprint sensor 110 may collect a user's fingerprint information. For example, the fingerprint sensor 110 may collect fingerprint information regarding lengths, directions, or specific points of ridges (e.g., points where ridges are branched, points where ridges are connected, or points where ridges end) included in the user's fingerprint.

The fingerprint information processing module 130 may process fingerprint information collected (or obtained) through the fingerprint sensor 110. For example, the fingerprint information processing module 130 may collect (or obtain), analyze, and store fingerprint information. Additionally, the fingerprint information processing module 130 may determine a fingerprint registration state during a fingerprint registration process and based on this determination, the fingerprint information processing module 130 may provide a feedback to a user. The fingerprint information processing module 130 includes a fingerprint information collection module 131, a fingerprint information analysis module 133, a fingerprint information storage module 135, a registration state determination module 137, and a feedback providing module 139.

The fingerprint information collection module 131 may control collection of fingerprint information through the fingerprint sensor 110. The fingerprint information collection module 131, for example, may control collection of fingerprint information according to a swipe method, when the fingerprint sensor 110 is a line scan fingerprint sensor. Alternatively, the fingerprint information collection module 131 may control collection of fingerprint information according to a touch method, when the fingerprint sensor 110 is an area scan fingerprint sensor. According to an embodiment of the present disclosure, the fingerprint information collection module 131 may control collection of fingerprint information according to a swipe method, when the fingerprint sensor 110 is an area scan fingerprint sensor. For example, the fingerprint information collection module 131 may control continuous collection of fingerprint information corresponding to a predetermined size of a fingerprint area at a specified time interval, and may obtain one fingerprint information item identical or similar to a fingerprint information item that would be obtained according to a swipe method by sequentially connecting the collected fingerprint information.

The fingerprint information analysis module 133 may analyze the collected (or obtained) fingerprint information. For example, the fingerprint sensor 133 may identify a curved type of a fingerprint and analyze fingerprint information regarding lengths, directions, or specific points (e.g., points where ridges are branched, points where ridges are connected, or points where ridges end) of ridges included in the fingerprint. The fingerprint information analysis module 133 may also determine a position relationship with respect to previously collected and registered fingerprint information. For example, the fingerprint information analysis module 133 may determine a position relationship between each other by using a specific point included in each fingerprint information item. According to an embodiment of the present disclosure, the fingerprint information analysis module 133 may identify the positions of fingerprint areas corresponding to each fingerprint information item based on fingerprint information corresponding to a reference area (e.g., a center area of a user's fingerprint or a first fingerprint area corresponding to first fingerprint information). For example, the fingerprint information analysis module 133 may specify a reference area as a predetermined area including a zero point of a horizontal axis (i.e., an x-axis) and a vertical axis (i.e., a y-axis) and may identify the positions of fingerprint areas corresponding to each fingerprint information based on a position relationship from the zero point.

According to an embodiment of the present disclosure, the fingerprint information analysis module 133 may analyze a frequency component, in addition to determining a position relationship of fingerprint information, calculating spatial information (e.g., position information), or detecting a feature portion according to a curved type of a fingerprint. For example, the fingerprint information analysis module 133 may analyze a frequency component of collected fingerprint information through an algorithm such as fast Fourier transform (FFT).

The fingerprint information storage module 135 may store collected (or obtained) fingerprint information in the memory 190. The fingerprint information storage module 135 may store, in the memory 10, information obtained by analyzing the collected fingerprint information through the fingerprint information analysis module 133. Additionally, the fingerprint information storage module 135 may link fingerprint information corresponding to adjacent fingerprint area based on a position relationship of fingerprint information. The fingerprint information storage module 135 may stitch together images and store fingerprint images corresponding to fingerprint information. For example, the fingerprint information storage module 135 may store fingerprint images corresponding to respective fingerprint information to allow fingerprint images corresponding to an adjacent fingerprint area to be connected to each other based on a relative position relationship of the images.

According to an embodiment of the present disclosure, the fingerprint information storage module 135 may control storage of the information (e.g., the collected fingerprint information, analysis information or fingerprint images) for only a specified time. For example, during a fingerprint registration process, the fingerprint information storage module 135 may store the information in the memory 190 and delete the stored information when the fingerprint registration is completed. Additionally, the fingerprint information storage module 135 may encrypt the information and store the encrypted information in the memory 190. The fingerprint information processing module 130 may perform a control operation such that the information is not stored.

The registration state determination module 137 may determine a fingerprint registration state. The registration state determination module 137 may determine a registration state based on fingerprint areas corresponding to previously collected and registered fingerprint information. For example, the registration state determination module 137 may specify a predetermined range of an area as a target area (e.g., an area necessary for user authentication) based on a reference area and may match the fingerprint areas to the target area. The registration state determination module 137 may calculate a ratio of an area corresponding to the fingerprint areas to the target area and determine whether the ratio satisfies the target value specified with a predetermined size (e.g., whether the ratio is greater than the specified target value). Additionally, the registration state determination module 137 may register a fingerprint area that does not overlap the fingerprint areas with respect to the collected fingerprint information.

The feedback providing module 139 may provide a feedback to a user during a fingerprint registration process. The feedback providing module 139 may analyze corresponding fingerprint information when fingerprint information is collected (or obtained) and may display a fingerprint area corresponding to corresponding fingerprint information on the display 170 based on a reference area. For example, the feedback providing module 139 may display the reference area in a predetermined area (e.g., the center area) of the display 170 and display a fingerprint area corresponding to corresponding fingerprint information on the display 170, according to a position relationship with the reference area. Additionally, the feedback providing module 139 may provide a fingerprint registration state to a user. For example, the feedback providing module 139 may display, on the display 170, a fingerprint area corresponding to previously collected and registered fingerprint information according to a position relationship with the reference area. The feedback providing module 139 may display, on the display 170, a ratio of an area corresponding to the fingerprint areas to the target area or the specified target value.

According to an embodiment of the present disclosure, the feedback providing module 139 may perform a method that includes inputting fingerprint information corresponding to a subject area (e.g., a fingerprint area included in a target area, but not yet obtained) for reaching the specified target value during a fingerprint registration process. For example, the feedback providing module 139 may output an object for inducing (i.e., instructing) a user to input fingerprint information corresponding to a subject area. The feedback providing module 139 may perform a control to display, on the display 170, a text or an inducing image for moving a user's finger in order for an area sensed by the fingerprint sensor 110 to match a subject area. The feedback providing module 139 may output voice information to correspond to the text or the image.

The processor 150 may execute calculation or data processing for control and/or communication of at least one another component in the electronic device 100. According to an embodiment of the present disclosure, the processor 150 may include at least one component included in the fingerprint information processing module 130. For example, during a fingerprint registration process, the processor 150 may collect (or obtain), analyze, or store fingerprint information and may perform a control to determine a fingerprint registration state and provide feedback to a user.

The display 170 may display various contents (e.g., texts, images, videos, icons, symbols, etc.) to a user. The display 170 may output various display objects, provided as feedback, to a user during a fingerprint registration process. For example, the display 170 may output display objects (e.g., dots, lines, figures, images, or icons) including information regarding a fingerprint area corresponding to collected (or obtained) fingerprint information, a fingerprint area corresponding to previously collected and registered fingerprint information, a reference area, a target area, or a subject area. Additionally, the display 170 may output a text or an image that instructs a user to move a finger.

The memory 190 may store instructions or data relating to at least one another component in the electronic device 100. According to an embodiment of the present disclosure, the memory 190 may store a stitched image based on collected (or obtained) fingerprint information, analysis information obtained by analyzing collected (or obtained) fingerprint information, a fingerprint image corresponding to the fingerprint information, or a position relationship of the fingerprint image. The memory 190 may temporarily store the fingerprint information, the analysis information, the fingerprint image, or the stitched image. For example, during a fingerprint registration process, the stored fingerprint information, analysis information, fingerprint image, or stitched image may be delivered from the memory 190, once the fingerprint registration is completed. The memory 190 may also store encrypted information when storing the above information.

As mentioned above, according to various embodiments of the present disclosure, an electronic device may include a fingerprint sensor for sensing a user's fingerprint and a fingerprint information processing module for controlling collection of second fingerprint information that corresponds to a predetermined range of a target area, based on a fingerprint area corresponding to first fingerprint information collected through the fingerprint sensor.

According to an embodiment of the present disclosure, in relation to a method of inputting fingerprint information corresponding to at least one unregistered fingerprint area in the target area, the fingerprint information processing module may control collection of fingerprint information through at least one of a swipe method and a touch method, according to a fingerprint registration state.

According to an embodiment of the present disclosure, the fingerprint information processing module may provide an input method of the second fingerprint information to a user.

According to an embodiment of the present disclosure, the fingerprint information processing module may control output of a display object corresponding to the input method to a display, or may control output of voice information corresponding to the input method through a voice output device.

According to an embodiment of the present disclosure, the fingerprint information processing module may provide information regarding the input method to a user in order to allow the fingerprint sensor to sense at least part of the target area in correspondence to at least part of the collected second fingerprint information.

According to an embodiment of the present disclosure, the input method may include a method of moving a finger by a user by a specified distance in a specified direction, with a predetermined curvature, based on a fingerprint area corresponding to the first fingerprint information. The input method, in addition or alternatively, may include a method of a moving a finger by a user in zigzag by using a specific point of the target area as a start point, based on a fingerprint area corresponding to the first fingerprint information.

According to an embodiment of the present disclosure, the fingerprint information processing module may provide the input method to a user in order to allow the fingerprint sensor to sense at least part of the target area based on a fingerprint area corresponding to the first fingerprint information.

According to an embodiment of the present disclosure, the fingerprint information processing module may output, to a display, a display object that instructs a user to move a finger in a specified direction, which is not a direction away from the target area, starting from a fingerprint area corresponding to the first fingerprint information, or may output voice information corresponding to the display object through a voice output device.

According to an embodiment of the present disclosure, the fingerprint information processing module may provide the input method to a user in order to allow the fingerprint sensor to sense at least part of the target area, based on a sensing area of the fingerprint sensor.

According to an embodiment of the present disclosure, the fingerprint information processing module may output, to a display, a display object that instructs a user to move a finger, in order for the sensing area to match at least part of the target area and a predetermined area, by using a position relationship of the sensing area and at least part of the target area. The fingerprint information processing module may output, additionally or as alternative, voice information corresponding to the display object through a voice output device.

According to an embodiment of the present disclosure, an electronic device may include a fingerprint sensor configured to sense a user's fingerprint, and a processor configured to electrically connect to the fingerprint sensor, identify, when first fingerprint information is obtained through the fingerprint sensor, a first fingerprint area corresponding to the first fingerprint information in a target area for a user authentication, and obtain second fingerprint information that is included in the target area and corresponds to a second fingerprint area adjacent to the first fingerprint area.

According to an embodiment of the present disclosure, the processor may obtain the second fingerprint information corresponding to an unregistered fingerprint area in the target area through at least one of a swipe method and a touch method according to a determination of whether obtained fingerprint information satisfies a condition for completing a fingerprint registration.

According to an embodiment of the present disclosure, the processor may provide an input method of the second fingerprint information to a user.

According to an embodiment of the present disclosure, the processor may perform at least one of outputting a display object corresponding to the input method to a display and outputting voice information corresponding to the input method through a voice output device.

According to an embodiment of the present disclosure, the processor may perform at least one of outputting, to a display, a display object that instructs a user to move a finger by a specified distance in a specified direction with a predetermined curvature based on the first fingerprint area and outputting voice information corresponding to the display object through a voice output device.

According to an embodiment of the present disclosure, the processor may perform at least one of outputting, to a display, a display object that instructs a user to move a finger in a zigzag pattern by using a specific point of the target area as a start point based on the first fingerprint area, and outputting voice information corresponding to the display object through a voice output device.

According to an embodiment of the present disclosure, the processor may perform at least one of outputting, to a display, a display object that instructs a user to move a finger by a specified distance in a specified direction within the target area, starting from the first fingerprint area, and outputting voice information corresponding to the display object through a voice output device.

According to an embodiment of the present disclosure, the processor may output, to a display, a first display object that represents a sensing area of the fingerprint sensor and a second display object that represents an unregistered fingerprint area in the target area, and perform at least one of outputting, to the display, a third display object that instructs a user to move a finger such that the first display object corresponds to a predetermined area of at least part of the second display object based on a relationship between a position of the first display object and a position of the second display object and outputting voice information corresponding to the third display object through a voice output device.

According to an embodiment of the present disclosure, when obtaining the second fingerprint information, the processor may calculate a ratio of an area corresponding to registered fingerprint areas to the target area and determine whether the ratio is greater than a target value specified with a predetermined size.

According to an embodiment of the present disclosure, when the ratio is less than the target value, the processor may obtain third fingerprint information corresponding to a third fingerprint area that is included in the target area and is adjacent to the first fingerprint area.

Figure 2A:
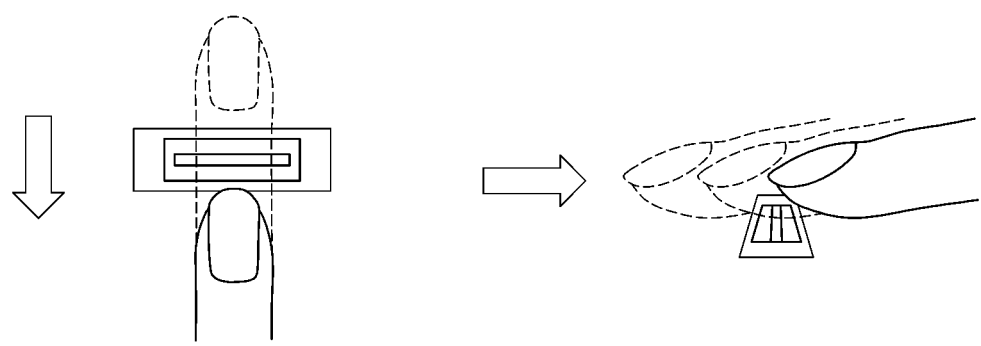
FIGS. 2A and 2B are diagrams illustrating a method of collecting fingerprint information according to an embodiment of the present disclosure.
Figure 2B:
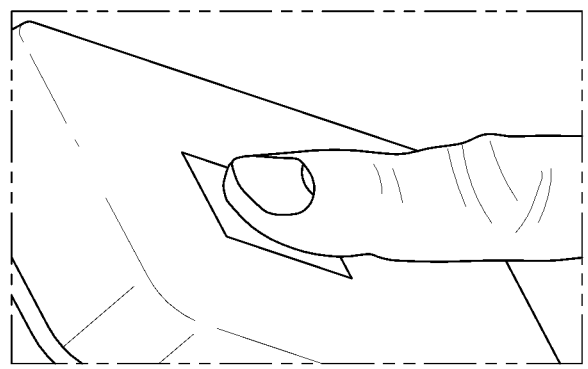

FIGS. 2A and 2B are diagrams illustrating a method of collecting fingerprint information according to an embodiment of the present disclosure. The method of collecting fingerprint information may include a swipe method or a touch method. FIG. 2A illustrates a swipe-type fingerprint input collecting method and FIG. 2B illustrates a touch-type fingerprint input collecting method.

Referring to FIG. 2A, the swipe method may include inputting fingerprint information as a user touches the fingerprint sensor 110 and rubs a fingerprint sensor in a specific direction (e.g., from top to bottom). The fingerprint sensor may continuously sense a user's fingerprint while a user's finger moves in a specific direction. The fingerprint sensor may also generate a fingerprint information item by connecting information obtained while continuously sensing a user's fingerprint.

Referring to FIG. 2B, the touch method include inputting fingerprint information as a user touches a fingerprint sensor with a finger. The fingerprint sensor may sense a touched fingerprint area of a user. The touch method may collect a fingerprint information item through a single corresponding touch operation. Accordingly, the touch method of FIG. 2B may require a fingerprint sensor including a sensing unit with a relatively larger size than the finger print sensor used with the swipe method of FIG. 2A.

According to an embodiment of the present disclosure, an area scan fingerprint sensor for collecting fingerprint information through the touch method may additionally perform the swipe-type fingerprint information collecting method.

For example, when using the area scan fingerprint sensor, a sensing unit may continuously sense a user's fingerprint moving in a specific direction at a specified time interval. The fingerprint sensor may generate a fingerprint information item by connecting information obtained while continuously sensing a user's touched fingerprint area. If the area scan fingerprint sensor additionally performs the swipe-type fingerprint information collecting method, such as in the above-described manner, even when using a fingerprint sensor that has a relatively small sensing unit, it remains possible to collect fingerprint information necessary for fingerprint registration.

Figure 3:
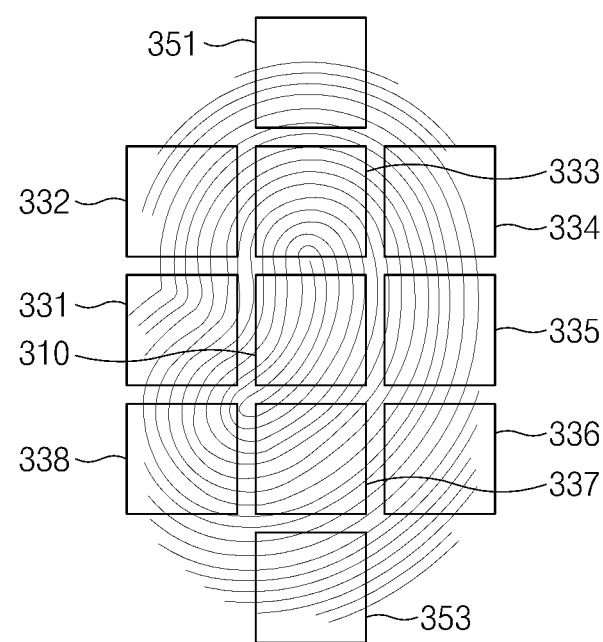
FIG. 3 is a diagram illustrating a fingerprint registration related fingerprint area according to an embodiment of the present disclosure.

FIG. 3 is a diagram illustrating a fingerprint registration related fingerprint area according to an embodiment of the present disclosure.

Referring to FIG. 3, the electronic device 100 may collect a user's fingerprint information through the fingerprint sensor 110. The electronic device may induce a user to touch a fingerprint sensor by a finger during a fingerprint registration process. The electronic device may specify a fingerprint area (e.g., a first fingerprint area 310) corresponding to the first collected fingerprint information as a reference area. The first fingerprint area 310 may be a fingerprint area sensed by a sensing unit of a fingerprint sensor according to a user's first touch operation. The first fingerprint area 310 may correspond to a sensing area of a sensing unit frequently touched when a user stochastically touches a fingerprint sensor by a finger.

According to various embodiments of the present disclosure, when the reference area is specified, the electronic device may specify a predetermined range of an area as a target area based on the reference area. For example, the electronic device may specify the target area to include fingerprint areas (i.e., a second fingerprint area 331, a third fingerprint area 332, a fourth fingerprint area 333, a fifth fingerprint area 334, a sixth fingerprint area 335, a seventh fingerprint area 336, an eighth fingerprint area 337, and a ninth fingerprint area 338) adjacent to the first fingerprint area 310, including the first fingerprint area 310. When a user performs user authentication through fingerprint recognition, the target area may include a fingerprint area that is frequently used for fingerprint recognition stochastically. The target area may be specified as an area having a spaced distance within a specified range, based on the core point of a knuckle (e.g., the core point of a fingerprint).

According to an embodiment of the present disclosure, when a fingerprint area is relatively far from the reference area, for example, a tenth fingerprint area 351 and an eleventh fingerprint area 353, the electronic device may not include the fingerprint area in the target area. However, even if a fingerprint area corresponding to collected fingerprint information is not included in the target area, the electronic device may register and store the fingerprint area together with fingerprint information corresponding to the target area during fingerprint registration. Through this additional storage of fingerprint information outside of the target area, the electronic device may increase a fingerprint recognition rate.

According to an embodiment of the present disclosure, when at least one specific fingerprint area is not registered among fingerprint areas included in the target area, the electronic device may specify the specific fingerprint area as a subject area. The subject area, as a fingerprint area must be registered to increase a fingerprint recognition rate during a fingerprint registration process, may include at least one unregistered fingerprint area among fingerprint areas included in the target area. For example, when the second fingerprint area 331 is not registered during a fingerprint registration process, the electronic device may specify the second fingerprint area 331 as a subject area. The electronic device may provide a feedback to a user in order to collect fingerprint information corresponding to the subject area. For example, the electronic device may induce to sense a user's fingerprint area corresponding to the subject area by using a fingerprint sensor through at least one of a swipe method and a touch method.

Figure 4:
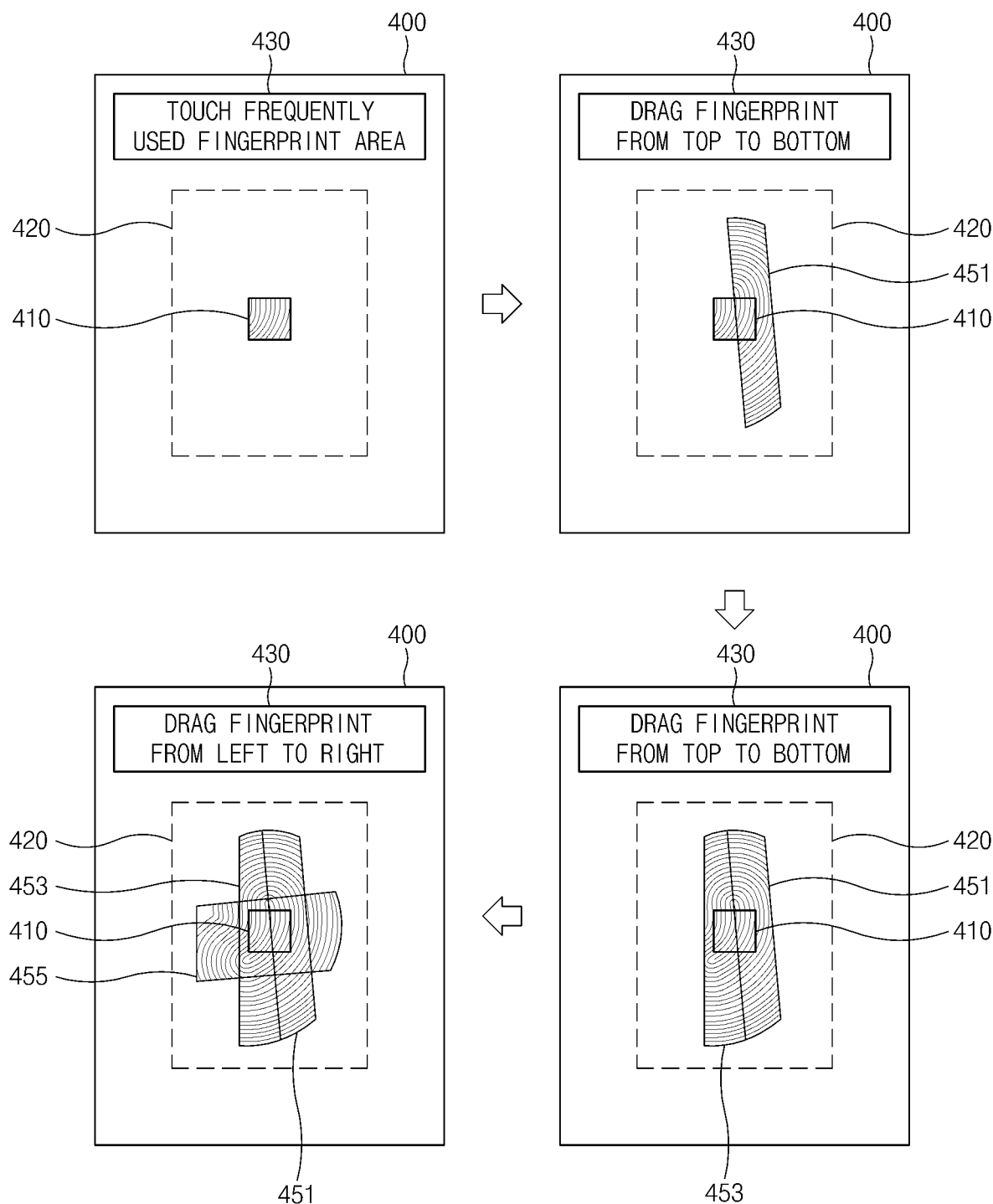
FIG. 4 is a diagram illustrating displayed screens according to a method of inputting fingerprint information in correspondence to the collection of additional fingerprint information according to an embodiment of the present disclosure.

FIG. 4 is a diagram illustrating a method of inputting fingerprint information in correspondence to the collection of additional fingerprint information according to an embodiment of the present disclosure.

Referring to FIG. 4, an electronic device (e.g., the electronic device 100) provides a fingerprint registration screen 400 to a user during a fingerprint registration process. The fingerprint registration screen 400, for example, may include collected fingerprint information, analysis information obtained by analyzing collected fingerprint information, registered fingerprint information, a fingerprint image corresponding to the fingerprint information, or a fingerprint area (e.g., a reference area, a target area, and a subject area) corresponding to the fingerprint information. The electronic device 100 also displays an instruction object 430 including a text or an image that instructs a user to perform a specific operation in a predetermined area of the fingerprint registration screen 400.

According to an embodiment of the present disclosure, the electronic device 100 specifies a first fingerprint area 410 corresponding to collected first fingerprint information as a reference area. Additionally, the electronic device specifies a predetermined range of an area based on the reference area as a target area 420. According to an embodiment of the present disclosure, the electronic device may collect additional fingerprint information through at least one of a swipe method and a touch method. As shown in FIG. 4, the electronic device collects fingerprint information corresponding to a first fingerprint area 410, which is the reference area through a touch method and may additionally collect fingerprint information corresponding to a second fingerprint area 451 through a swipe method. The electronic device may display, on the fingerprint registration screen 400, a fingerprint area (e.g., the first fingerprint area 410 or the second fingerprint area 451) corresponding to collected fingerprint information. For example, the electronic device may display the reference area in the center area of the fingerprint registration screen 400 and may display the second fingerprint area 451 in a predetermined area of the fingerprint registration screen 400 based on a position relationship with the reference area.

According to an embodiment of the present disclosure, the electronic device may provide information regarding a fingerprint information inputting method to a user in order to collect additional fingerprint information. For example, the electronic device may determine a fingerprint registration state with respect to the collection of additional fingerprint information, and if a target value of a registration state (i.e., the ratio of an area corresponding to the fingerprint areas to the target area) is not reached, the electronic device may provide feedback to a user in order to collect fingerprint information corresponding to a subject area. The electronic device may output a text or an image that instructs the user to perform a specific operation, in the instruction object 430, and display the object 430 on the fingerprint registration screen 400. The electronic device may output voice information corresponding to the instruction object 430 through a voice output device. For example, as shown in FIG. 4, the electronic device determines a relationship of the position of the second fingerprint area 451 relative to the reference area, and outputs the instruction object 430 including a text that instructs a user's finger to swipe in a specific direction (e.g., from the top to the bottom) in order to collect additional fingerprint information.

According to an embodiment of the present disclosure, the electronic device may reach a target value of a fingerprint registration state by repeatedly performing a process of collecting additional fingerprint information. As shown in FIG. 4, the electronic device additionally collects fingerprint information corresponding to a third fingerprint area 453 and a fourth fingerprint area 455. Through this additional collection, a ratio of an area corresponding to registered fingerprint areas (e.g., the first fingerprint area 410, the second fingerprint area 451, the third fingerprint area 453, and the fourth fingerprint area 455) to the target area 420 may satisfy the target value.

According to an embodiment of the present disclosure, the electronic device may collect additional fingerprint information without initially specifying the reference area. Instead, the electronic device may set the target value to a ratio such that an entire fingerprint area corresponding to fingerprint information, which is collected until a specific condition (e.g., elapse of a specified time) is satisfied, corresponds to a specified size of an area.

Figure 5:
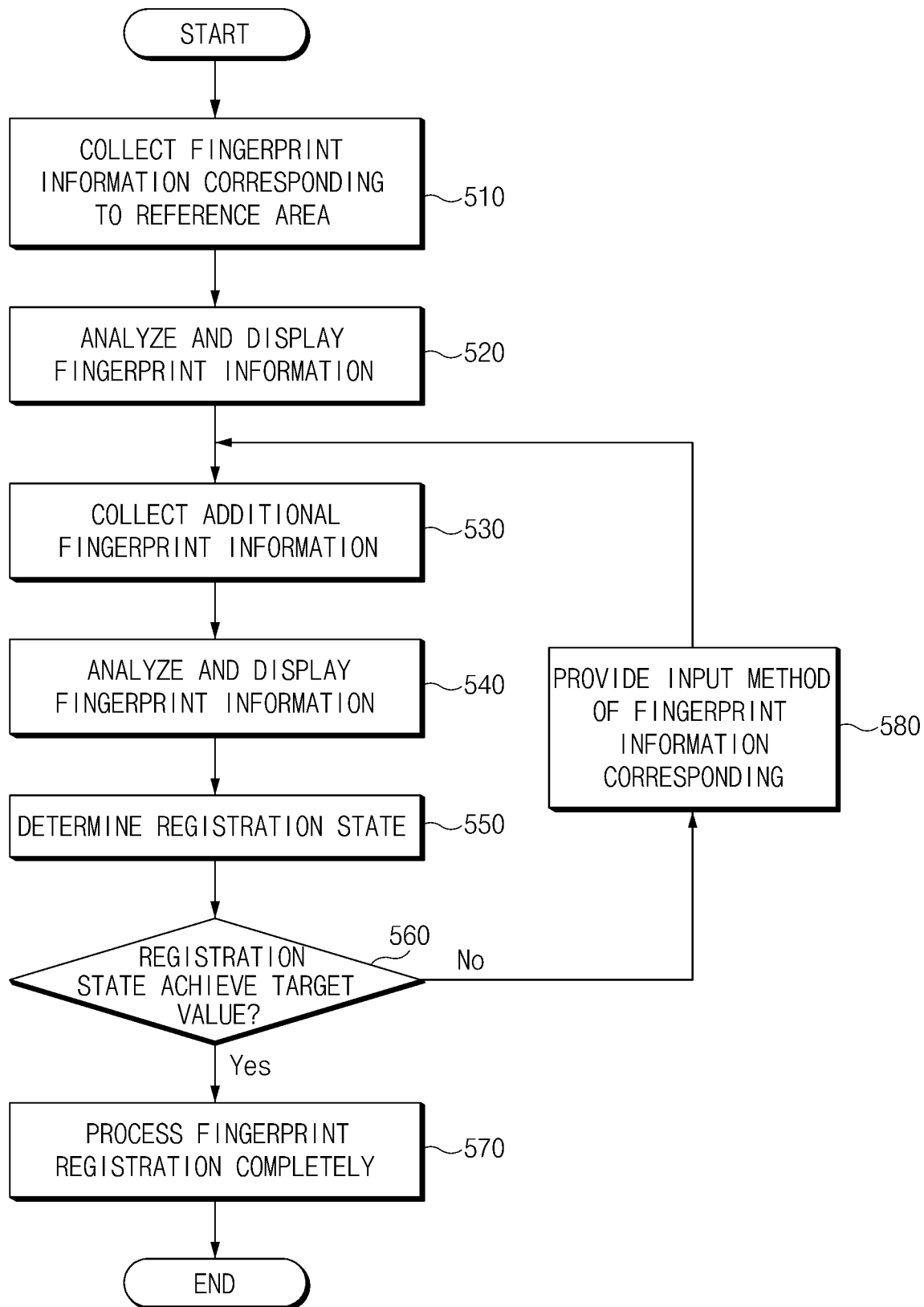
FIG. 5 is a flowchart illustrating a method of an electronic device for providing a fingerprint information inputting method in correspondence to the collection of additional fingerprint information according to an embodiment of the present disclosure.

FIG. 5 is a flowchart illustrating a method of an electronic device for providing a fingerprint information inputting method corresponding to the collection of additional fingerprint information according to an embodiment of the present disclosure.

Referring to FIG. 5, an electronic device (e.g., the electronic device 100) collects fingerprint information corresponding to a reference area, in operation 510. For example, the electronic device may specify a fingerprint area corresponding to the collected first fingerprint information as the reference area during a fingerprint registration process. According to an embodiment of the present disclosure, the electronic device may collect a user's fingerprint information by using a touch method as a first sensing operation during a fingerprint registration process. In operation 520, the electronic device analyzes and displays the collected fingerprint information. For example, the electronic device may analyze fingerprint information regarding lengths, directions, or specific points (e.g., points where ridges are branched, points where ridges are connected, or points where ridges end) of ridges included in the user's fingerprint. The electronic device may also display a fingerprint area corresponding to the fingerprint information on a display (e.g., the display 170).

In operation 530, the electronic device collects additional fingerprint information. According to an embodiment of the present disclosure, the electronic device may collect additional fingerprint information of the user through at least one of a swipe method and a touch method. In operation 540, the electronic device analyzes and displays the additionally collected fingerprint information.

In operation 550, the electronic device determines a fingerprint registration state. For example, the electronic device may determine a registration state based on fingerprint areas corresponding to the registered fingerprint information. According to an embodiment of the present disclosure, determining the registration state may include determining an area where a fingerprint area corresponding to the additionally collected fingerprint information does not overlap a fingerprint area corresponding to pre-registered fingerprint information. The electronic device may determine a registration state by matching the non-overlapping area and a target area.

In operation 560, the electronic device determines whether a target value of a fingerprint registration state is reached. For example, the electronic device may calculate a ratio of an area corresponding to registered fingerprint areas to a target area and determine whether the ratio satisfies the target value specified with a predetermined size (e.g., whether the ratio is greater than the target value). According to an embodiment of the present disclosure, the electronic device may use a ratio determined such that the non-overlapping area corresponds to the target area, in operation 550.

When the target value of the fingerprint registration state is reached, the electronic device completes a fingerprint registration, in operation 570. For example, the electronic device may store the registered fingerprint information in a memory (e.g., the memory 190). According to an embodiment of the present disclosure, the electronic device may connect registered fingerprint information items based on relative position relationships of the fingerprint information items, and store the connected fingerprint information items as a single fingerprint information item. Additionally, the electronic device may store a fingerprint image corresponding to the fingerprint information. The electronic device may also output a text, an image, or voice information indicating that the fingerprint registration is completed.

In response to determination that the target value of the first fingerprint registration state has not yet been reached in operation 560, the electronic device provides, to a user, an indication of a method of inputting fingerprint information corresponding to a subject area, in operation 580. For example, the electronic device may instruct a user to provide input of a fingerprint area corresponding to the subject area via a fingerprint sensor through at least one of a swipe method and a touch method. According to an embodiment of the present disclosure, the electronic device may output a text, an image, or voice information to instruct the user to perform a specific operation (e.g., touching a fingerprint sensor with a portion of a finger corresponding to the subject area). After outputting the instructions in 580, the electronic device returns to operation 530 and performs processing on additional fingerprint information.

Figure 6A:
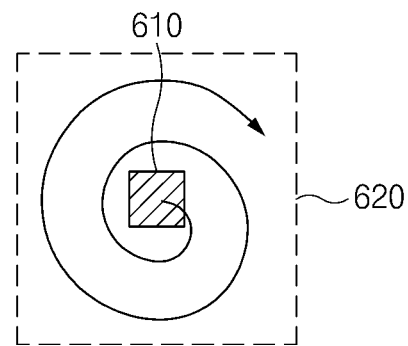
FIGS. 6A and 6B are diagrams illustrating a recommendation pattern for a fingerprint information inputting method according to various embodiments of the present disclosure.
Figure 6B:
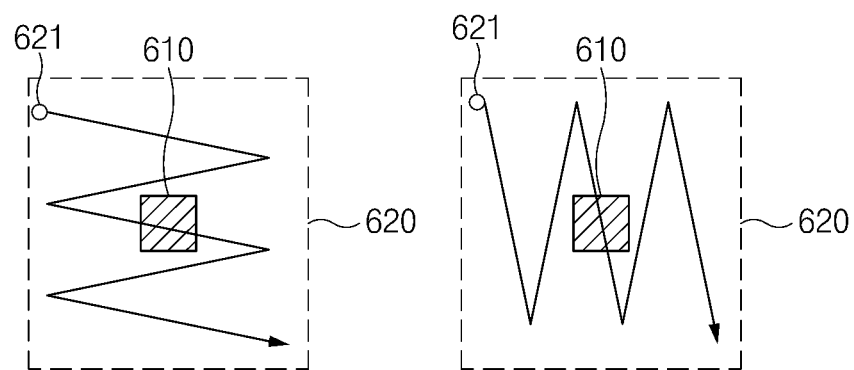

FIGS. 6A and 6B are diagrams illustrating a recommendation pattern for a fingerprint information inputting method according to an embodiment of the present disclosure. An electronic device (e.g., the electronic device 100) may instruct a user to perform a specific operation in order to reach a target value of a fingerprint registration state during a fingerprint registration process. For example, the electronic device may instruct a user to touch a subject area with a finger or move a finger according to a predetermined pattern. The predetermined pattern may be a recommendation pattern for providing input of fingerprint areas corresponding to fingerprint information, which is collected as the electronic device induces a user to move a user's finger and corresponds to a target area for more than a predetermined ratio.

Referring to FIG. 6A, the electronic device may provide a fingerprint information inputting method with a spiral pattern. For example, the electronic device may instruct a user to move a user's finger by a specified distance in a specified direction according to a predetermined curvature based on a reference area 610. When recommending a fingerprint information inputting method with a spiral pattern, the electronic device may be able to quickly collect fingerprint information corresponding to an area adjacent to the reference area 610.

Referring to FIG. 6B, the electronic device may use a method of inputting fingerprint information with a zigzag pattern. For example, the electronic device may instruct a user to move the finger in zigzag on a specified target area 620 based on a reference area 610. The electronic device may instruct the user to move the finger in zigzag, starting from a specific point 621 of a target area 620 (e.g., the upper left corner of the target area 620) to the opposite point of the specific point 621 (e.g., the lower right corner of the target area 620). By using a method of inputting fingerprint information in a zigzag pattern, the electronic device may reduce the probability of a spatial gap occurring between corresponding images, when a fingerprint images corresponding to collected fingerprint information are stitched together. According to an embodiment of the present disclosure, the electronic device may instruct the user to use various forms of patterns to a user in addition or as an alternative to a spiral or zigzag pattern.

Figure 7:
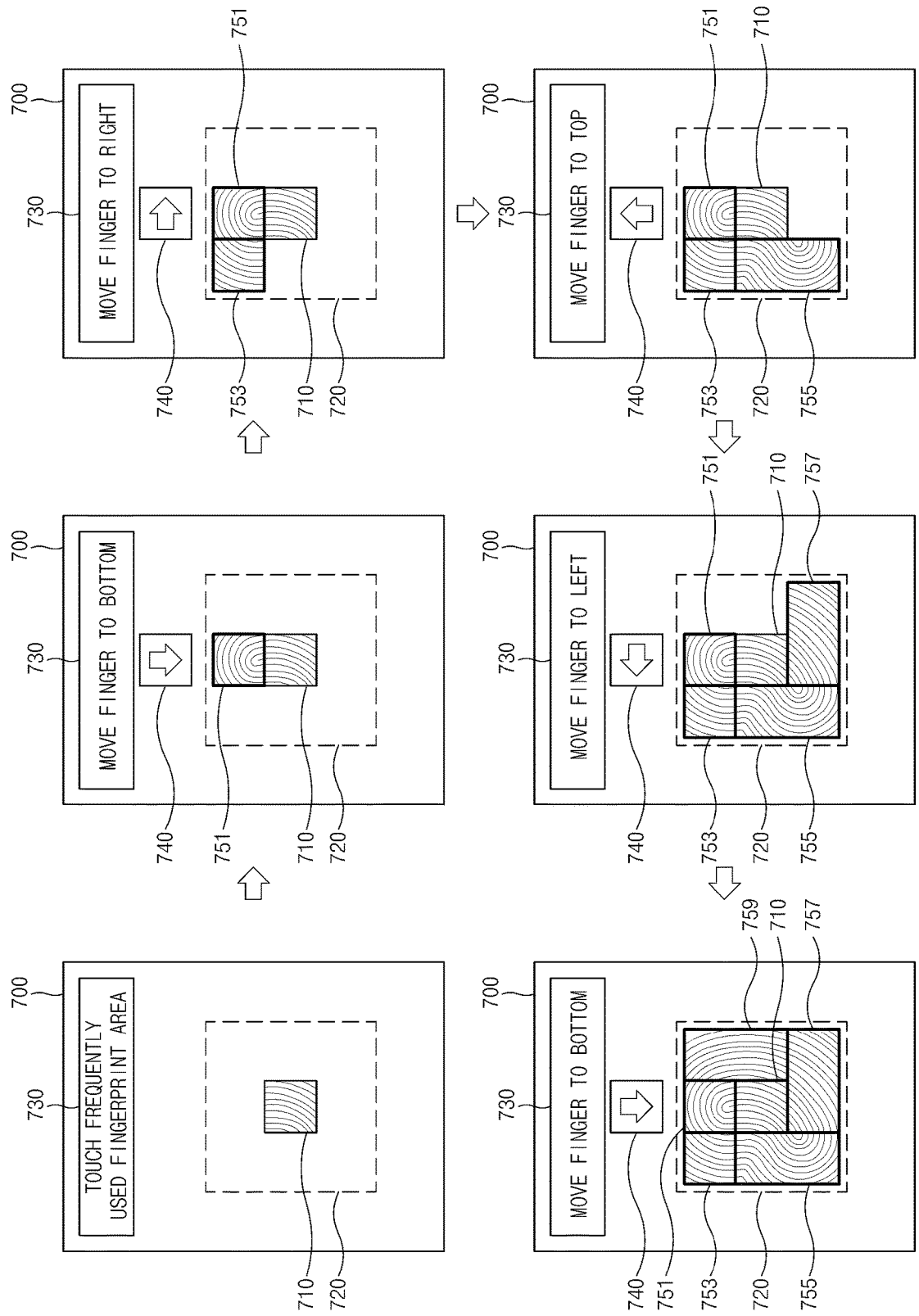
FIG. 7 is a diagram illustrating displayed screens according to a fingerprint information inputting method based on a reference area according to an embodiment of the present disclosure.

FIG. 7 is a diagram illustrating displayed screens according to a fingerprint information inputting method based on a reference area according to an embodiment of the present disclosure.

Referring to FIG. 7, an electronic device (e.g., the electronic device 100) displays, on a fingerprint registration screen 700, a fingerprint area corresponding to collected fingerprint information. For example, the electronic device specifies a first fingerprint area 710 corresponding to first collected fingerprint information during a fingerprint registration process, as a reference area and displays a corresponding area on a display (e.g., the display 170). Additionally, the electronic device specifies a predetermined range of an area based on the reference area as a target area 720 and displays a target area 720.

According to an embodiment of the present disclosure, the electronic device may provide a fingerprint information inputting method to a user based on the reference area. For example, the electronic device instructs a user to move the finger in a specified direction staring from the reference area not to be away from the target area 720. In the present example, the electronic device displays an instruction text 730 and an instruction image 740 for instructing a user to perform a specific operation. The electronic device instructs the user to move the finger counterclockwise, starting from the reference area. As shown in FIG. 7, the electronic device instructs the user to move the finger downwards, which corresponds to an upwards direction within the target area 720, starting from the reference area. The electronic device then changes the instruction text 730 and the instruction image 740, in order for to prevent the finger from moving away from the target area 720. In the present example, the electronic device instructs the user to move the finger in a counterclockwise direction by displaying a right arrow image the instruction image 740. The electronic device also displays a second fingerprint area 751 corresponding to fingerprint information already collected as the finger moves. The electronic device then instructs the user, through the instruction text 730, to move the user's finger without moving away from a fingerprint sensor (e.g., the fingerprint sensor 110).

By repeating the above-mentioned operations, the electronic device collects fingerprint information corresponding to a second fingerprint area 752, a third fingerprint area 753, a fourth fingerprint area 755, a fifth fingerprint area 757, and a sixth fingerprint area 759 adjacent to the reference area.

The electronic device also provides feedback to allow the user to check a fingerprint registration state in relation to fingerprint information already registered until now, by displaying the fingerprint areas.

According to an embodiment of the present disclosure, if a user's finger is removed from a fingerprint sensor while collecting fingerprint information corresponding to a subject area starting from the reference area, the electronic device may store fingerprint information collected until a stop point (i.e., a point when the finger is removed) in a memory (e.g., the memory 190). The electronic device may also determine whether the fingerprint information collected until the stop point reaches a target value of a fingerprint registration state. If the ratio of the area of the fingerprint information collected until the stop point to the reference area does not reach the target value of the fingerprint registration state, the electronic device may display an instruction text 730 that instructs a user to touch a fingerprint sensor by a finger. The electronic device may output voice information corresponding to the instruction text 730 through a voice output device. When the user touches the fingerprint sensor with the finger within a specified time from the stop point, the electronic device may display, on the display, fingerprint areas corresponding to fingerprint information collected until the stop point, and collect fingerprint information corresponding to a subject area to a user. If the user does not touch the fingerprint sensor by the finger within a specified time from the stop point, the electronic device may determine that the fingerprint registration is completed by using the fingerprint information collected until the stop point.

Figure 8:
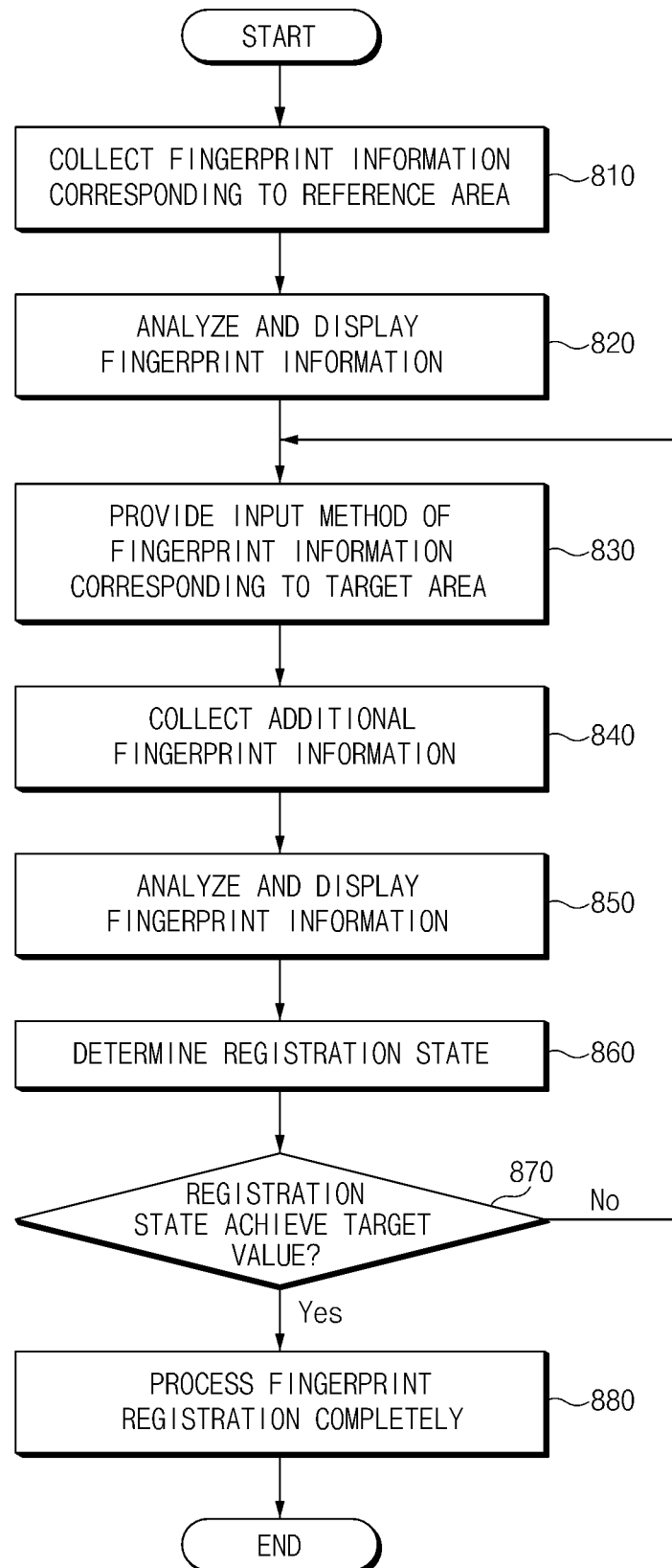
FIG. 8 is a flowchart illustrating an operating method of an electronic device for providing a fingerprint information inputting method based on a reference area according to an embodiment of the present disclosure.

FIG. 8 is a flowchart illustrating an operating method of an electronic device for providing a fingerprint information inputting method based on a reference area according to various embodiments of the present disclosure.

Referring to FIG. 8, an electronic device (e.g., the electronic device 100) collects fingerprint information corresponding to a reference area, in operation 810. For example, the electronic device may specify a fingerprint area corresponding to the collected first fingerprint information as the reference area during a fingerprint registration process. In operation 820, the electronic device analyzes and displays the collected fingerprint information. For example, the electronic device may analyze the collected fingerprint information and display a fingerprint area corresponding to the fingerprint information on a display (e.g., the display 170) based on the analyzed analysis information.

According to an embodiment of the present disclosure, the electronic device receives input fingerprint information corresponding to a subject area to a user, in operation 830. For example, the electronic device may output an object (e.g., the instruction text 730 and/or the instruction image 740) instructing the user to move the finger in a specified direction starting from the reference area, while not moving away from the target area 720.

In operation 840, the electronic device collects additional fingerprint information according to a finger movement. In operation 850, the electronic device analyzes and displays the collected fingerprint information. For example, the electronic device may analyze the additional fingerprint information, identify a position relationship with previously collected and registered fingerprint information, and display a fingerprint area corresponding to the additional fingerprint information on the display based on the position relationship.

In operation 860, the electronic device determines a fingerprint registration state. For example, the electronic device determines a registration state based on a fingerprint areas corresponding to the previously collected and registered fingerprint information and the additional fingerprint information. The electronic device may allow a user to receive a feedback on a fingerprint registration state by displaying fingerprint areas corresponding to additional fingerprint information according to a finger movement, which includes the reference area.

In operation 870, the electronic device determines whether a target value of a fingerprint registration state is reached. When the target value of the fingerprint registration state has not been reached, the electronic device returns to operation 830, and the electronic device provides, to the user, instructions according a method of inputting fingerprint information corresponding to a subject area. When the target value of the fingerprint registration state is reached, the electronic device completes a fingerprint registration process, in operation 880.

Figure 9:
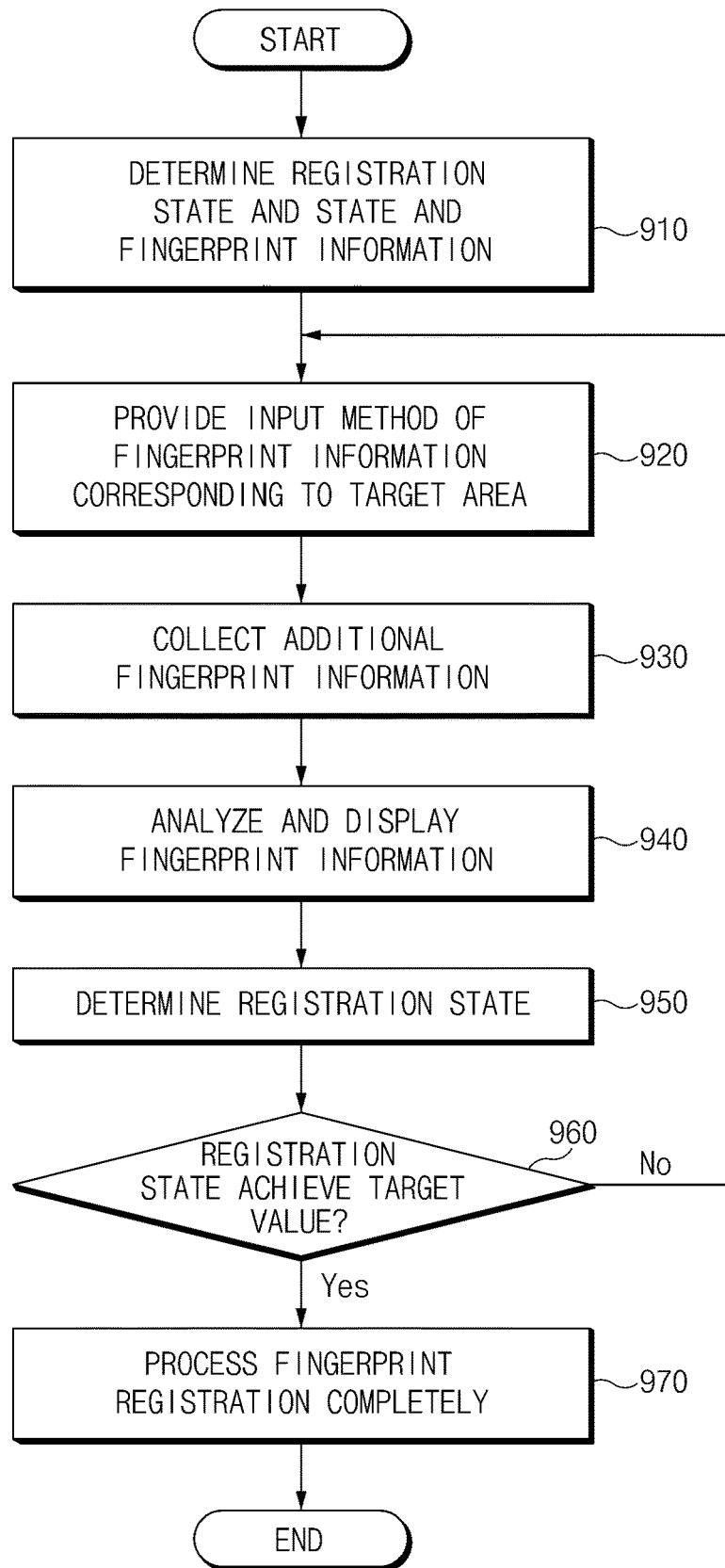
FIG. 9 is a flowchart illustrating an operating method of an electronic device in relation to a re-attempt at fingerprint registration according to an embodiment of the present disclosure.

FIG. 9 is a flowchart illustrating an operating method of an electronic device in relation to a re-attempt at performing fingerprint registration according to various embodiments of the present disclosure. An input of fingerprint information may stop before an electronic device (e.g., the electronic device 100) reaches a target value of a fingerprint registration state, during a fingerprint registration process. For example, while a user inputs fingerprint information by moving the finger while remaining in contact with a fingerprint sensor (e.g., the fingerprint sensor 110), the user's finger may be removed from the fingerprint sensor, and the electronic device may process a fingerprint registration to be completed by using fingerprint information collected from the time point that the finger is removed from the fingerprint sensor (i.e., a stop point). Alternatively, the electronic device may instruct a user to place the finger back onto the fingerprint sensor. The electronic device may store the fingerprint information collected until the stop point in a memory (e.g., the memory 190).

When a user touches the fingerprint sensor with a finger within a specified time after the stop point, in operation 910, the electronic device determines a fingerprint registration state and displays the fingerprint information registered until the stop point. For example, the electronic device may display a fingerprint area corresponding to the fingerprint information that is registered until the stop point.

According to an embodiment of the present disclosure, the electronic device may compare a fingerprint area corresponding to previously collected and registered fingerprint information and a target area, and specify at least one unregistered fingerprint area in the target area as a subject area. The electronic device may also provide a method of inputting fingerprint information corresponding to the subject area to a user, in operation 920. The electronic device may collect fingerprint information corresponding to a subject area through at least one of a swipe method and a touch method, according to a fingerprint registration state. Operations 930 through 970 may be performed in a same or similar manner as operations 840 through 880 described herein above with reference to FIG. 8.

Figure 10:
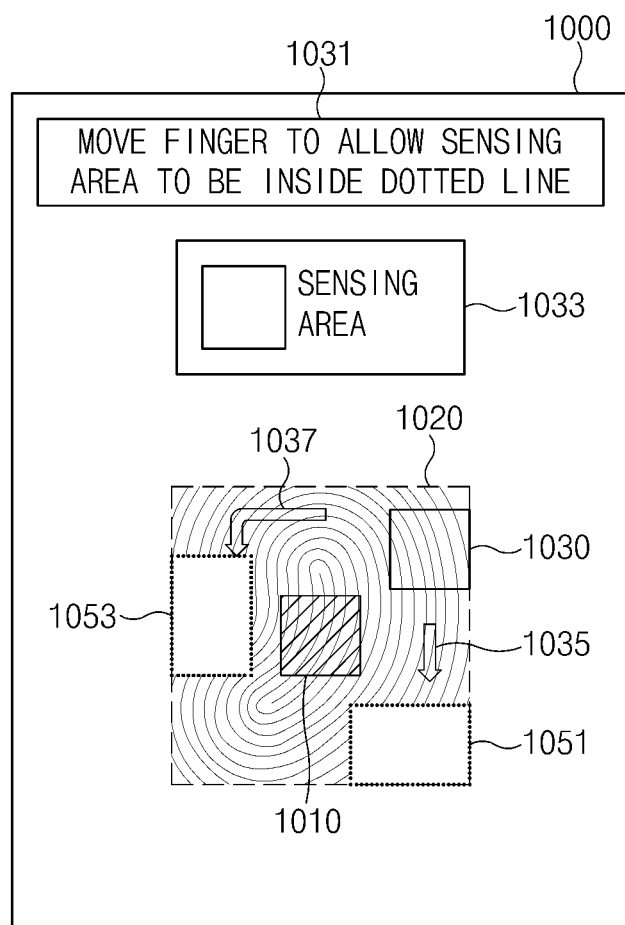
FIG. 10 is a diagram illustrating a displayed screen according to a fingerprint information inputting method based on a sensing area according to an embodiment of the present disclosure.

FIG. 10 is a diagram illustrating a displayed screen according to a fingerprint information inputting method based on a sensing area according to an embodiment of the present disclosure.

Referring to FIG. 10, an electronic device (e.g., the electronic device 100) displays information fed back to a user during a fingerprint registration process, on a fingerprint registration screen 1000. The electronic device displays, on the fingerprint registration screen 1000, an area corresponding to collected fingerprint information and a fingerprint area corresponding to registered fingerprint information. For example, the electronic device displays fingerprint areas corresponding to registered fingerprint information, including a reference area 1010. The electronic device displays a target area 1020 and at least one subject area (e.g., a first subject area 1051 and a second subject area 1053).

According to an embodiment of the present disclosure, the electronic device displays an area sensed by a sensing unit of a fingerprint sensor (e.g., the fingerprint sensor 110), such as a sensing area 1030. The sensing area 1030 is a fingerprint area that is currently sensed by the sensing unit of the fingerprint sensor. Accordingly, a user is able to easily check the position of the sensing area 1030 and the subject area on the fingerprint registration screen 1000. In order to distinguish an object for displaying the sensing area 1030 (e.g., figures or images), the electronic device additionally displays a display object 1033 that represents information such as the type, shape, or color of the displayed object, on the upper end of the fingerprint registration screen 1000.

According to an embodiment of the present disclosure, the electronic device provides, to a user, information regarding a method of inputting fingerprint information corresponding to the subject area based on the sensing area 1030. For example, the electronic device displays an instruction text 1031 and at least one instruction image, including a first instruction image 1035 and a second instruction image 1037, which instructs a user to perform a specific operation by using a position relationship of the sensing area 1030 and the subject area. When the subject area is divided into a plurality of areas, the electronic device may provide a method of inputting fingerprint information corresponding to a subject area of which distance from the sensing area 1030 is relatively short. For example, if a distance from the sensing area 1030 to the first subject area 1050 is relatively short compared to a distance to the second subject area 1053, the electronic device may provide information regarding a method of inputting fingerprint information corresponding to the first target area 1051 to a user. In this case, the electronic device may position the first instruction image 1035 between the sensing area 1030 and the first target area 1051 and display the first instruction image 1035. The electronic device may output voice information corresponding to the instruction text 1031 through a voice output device.

As mentioned above, according to an embodiment of the present disclosure, a fingerprint information processing method of an electronic device may include collecting first fingerprint information through a fingerprint sensor for sensing a user's fingerprint, specifying a predetermined range of a target area based on a fingerprint area corresponding to the first fingerprint information, and controlling a collection of second fingerprint information to correspond to the target area.

According to an embodiment of the present disclosure, control of the collection of the second fingerprint information may include obtaining an unregistered fingerprint area in the target area through at least one of a swipe method and a touch method according to a fingerprint registration state.

According to an embodiment of the present disclosure, control of the collection of the second fingerprint information may include providing information regarding an input method of the second fingerprint information to a user.

According to an embodiment of the present disclosure, providing information regarding the input method may include at least one of outputting a display object corresponding to the input method to a display and outputting voice information corresponding to the input method through a voice output device.

According to an embodiment of the present disclosure, providing information regarding the input method may further include providing information regarding the input method to a user in order to allow the fingerprint sensor to sense at least part of the target area in correspondence to at least part of the collected second fingerprint information.

According to an embodiment of the present disclosure, providing information regarding the input method may include providing information regarding a method in which a user move a finger by a specified distance in a specified direction with a predetermined curvature based on a fingerprint area corresponding to the first fingerprint information or a method in which a user moves a finger in a zigzag pattern by using a specific point of the target area as a start point based on a fingerprint area corresponding to the first fingerprint information.

According to an embodiment of the present disclosure, providing information regarding the input method may further include providing information regarding the input method to a user in order to allow the fingerprint sensor to sense at least part of the target area based on the fingerprint area corresponding to the first fingerprint information.

According to an embodiment of the present disclosure, providing information regarding the input method may further include outputting, to a display, a display object that instructs a user to move a finger in a specified direction not to be off the target area, starting from the fingerprint area corresponding to the first fingerprint information or outputting voice information corresponding to the display object through a voice output device.

According to an embodiment of the present disclosure, providing information regarding the input method may further include providing the input method to a user in order to allow the fingerprint sensor to sense at least part of the target area based on the sensing area of the fingerprint sensor.

According to an embodiment of the present disclosure, providing information regarding the input method may further include at least one of outputting, to a display, a display object instructing a user to move a finger such that the sensing area matches at least part of the target area and a predetermined area by using a relationship between a position of the sensing area and a position of at least part of the target area, and outputting voice information corresponding to the display object through a voice output device.

As mentioned above, according to an embodiment of the present disclosure, a fingerprint information processing method of an electronic device may include obtaining first fingerprint information through a fingerprint sensor for sensing a user's fingerprint, identifying a first fingerprint area corresponding to the first fingerprint information in a target area for a user authentication, and obtaining second fingerprint information that is included in the target area and corresponds to a second fingerprint area adjacent to the first fingerprint area.

According to an embodiment of the present disclosure, obtaining the second fingerprint information may include obtaining an unregistered fingerprint area in the target area through at least one of a swipe method and a touch method according to a determination of whether obtained fingerprint information satisfies a condition for completing a fingerprint registration.

According to an embodiment of the present disclosure, obtaining the second fingerprint information may include providing an input method of the second fingerprint information to a user.

According to an embodiment of the present disclosure, providing the input method may include at least one of outputting a display object corresponding to the input method to a display and outputting voice information corresponding to the input method through a voice output device.

According to an embodiment of the present disclosure, providing the input method may include at least one of outputting, to a display, a display object that instructs a user to move a finger by a specified distance in a specified direction with a predetermined curvature based on the first fingerprint area and outputting voice information corresponding to the display object through a voice output device.

According to an embodiment of the present disclosure, providing the input method may include at least one of outputting, to a display, a display object that instructs a user to move a finger in a zigzag pattern by using a specific point of the target area as a start point based on the first fingerprint area, and outputting voice information corresponding to the display object through a voice output device.

According to an embodiment of the present disclosure, providing the input method may include at least one of outputting, to a display, a display object that instructs a user to move a finger by a specified distance in a specified direction within the target area, starting from the first fingerprint area, and outputting voice information corresponding to the display object through a voice output device.

According to an embodiment of the present disclosure, providing the input method may include outputting, to a display, a first display object that represents a sensing area of the fingerprint sensor and a second display object that represents an unregistered fingerprint area in the target area, and at least one of outputting, to the display, a third display object that instructs a user to move a finger such that the first display object corresponds to a predetermined area of at least part of the second display object based on a relationship between a position of the first display object and a position of the second display object, and outputting voice information corresponding to the third display object through a voice output device.

According to an embodiment of the present disclosure, the method may further include, when obtaining the second fingerprint information, calculating a ratio of an area corresponding to registered fingerprint areas to the target area and determining whether the ratio is greater than a target value specified with a predetermined size.

According to an embodiment of the present disclosure, the method may further include, when the ratio is less than the target value, obtaining third fingerprint information corresponding to a third fingerprint area that is included in the target area and is adjacent to the first fingerprint area.

Figure 11:
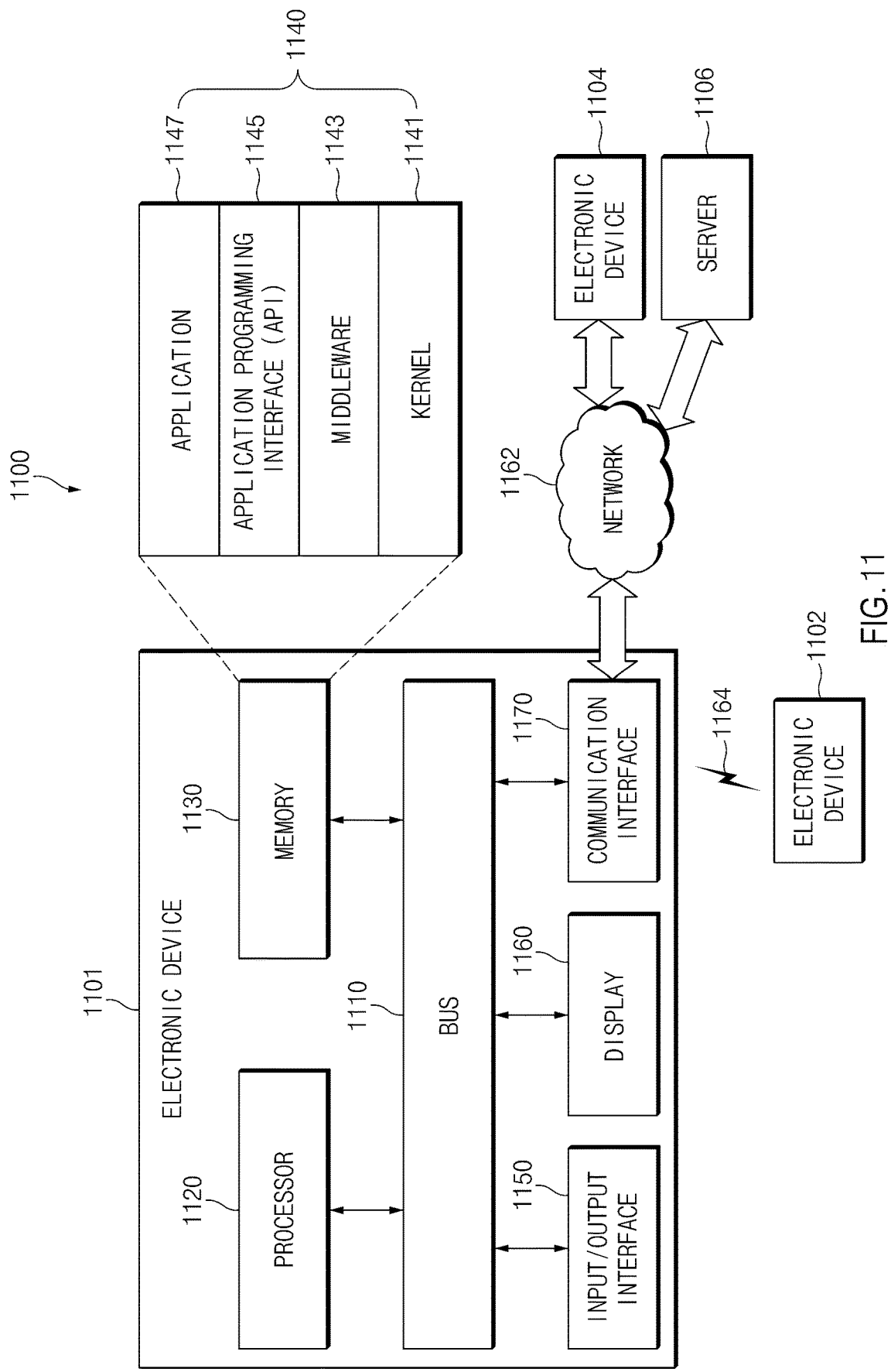
FIG. 11 is a diagram illustrating an electronic device in a network environment according to an embodiment of the present disclosure.

FIG. 11 is a diagram illustrating an electronic device in a network environment according to an embodiment of the present disclosure.

Referring to FIG. 11, an electronic device 1101 is included in a network environment 1100. The electronic device 1101 includes a bus 1110, a processor 1120, a memory 1130, an input/output interface 1150, a display 1160, and a communication interface 1170. The electronic device 1101 may omit at least one of the components or may additionally include different components.

The bus 1110 includes a circuit for connecting the components 1110 to 1170 to each other and delivering a communication (e.g., control message and/or data) between the components 1110 to 1170.

The processor 1120 may include at least one of a central processing unit (CPU), an Application Processor (AP), and a communication processor (CP). The processor 1120, for example, may execute calculation or data processing for control and/or communication of at least one another component of the electronic device 1101.

The memory 1130 may include volatile and/or nonvolatile memory. The memory 1130 stored instructions or data relating to at least one another component of the electronic device 1101. The memory 1130 stores software and/or program 1140. The program 1140 includes a kernel 1141, a middleware 1143, an application programming interface (API) 1145, and an application program (or an application) 1147. At least part of the kernel 1141, the middleware 1143, and the API 1145 may be referred to as an operating system (OS).

The kernel 1141 may control or manage system resources (e.g., the bus 1110, the processor 1120, the memory 1130, etc.) used for performing operations or functions implemented in other programs (e.g., the middleware 1143, the API 1145, or the application program 1147). Additionally, the kernel 1141 may provide an interface for controlling or managing system resources by accessing an individual component of the electronic device 1101 from the middleware 1143, the API 1145, or the application program 1147.

The middleware 1143, for example, may serve as an intermediary for exchanging data as the API 1145 or the application program 1147 communicates with the kernel 1141.

The middleware 1143 may also process at least one job request received from the application program 1147 according to a priority.

For example, the middleware 1143 may assign, to at least one application program 1147, a priority for using a system resource (e.g., the bus 1110, the processor 1120, or the memory 1130) of the electronic device 1101. For example, the middleware 1143 may perform scheduling or load balancing on the at least one job request by processing the at least one job request according to the priority assigned to the at least one job request.

The API 1145, as an interface for allowing the application 1147 to control a function provided from the kernel 1141 or the middleware 1143, may include at least one interface or function (for example, an instruction) for file control, window control, image processing, or character control.

The input/output interface 1150 may serve as an interface for delivering instructions or data inputted from a user or another external device to another component(s) of the electronic device 1101. Additionally, the input/output interface 1150 may output instructions or data received from another component(s) of the electronic device 1101 to a user or another external device.

The display 1160 may include a liquid crystal display (LCD), a light emitting diode (LED) display, an organic light emitting diode (OLED) display, a microelectromechanical systems (MEMS) display, or an electronic paper display. The display 1160, for example, may display a variety of content (e.g., text, image, video, icon, symbol, and so on) to a user. The display 1160 may include a touch screen, and for example, may receive a touch, gesture, proximity, or hovering input by using an electronic pen or a user's body part.

The communication interface 1170 may set a communication between the electronic device 1101 and an external device (for example, the first external electronic device 1102, the second external electronic device 1104, or the server 1106). For example, the communication interface 1170 may communicate with the external device 1104 or the server 1106 in connection to the network 1162 through wireless communication or wired communication.

The wireless communication, as a cellular communication protocol, may use at least one of long-term evolution (LTE), LTE Advance (LTE-A), code division multiple access (CDMA), wideband CDMA (WCDMA), universal mobile telecommunications system (UMTS), Wireless Broadband (WiBro), Global System for Mobile Communications (GSM), etc. The wireless communication includes a short range communication 1164. The short range communication 1164 may include at least one of wireless fidelity (WiFi), Bluetooth (BT), near field communication (NFC), global positioning system (GPS), Global Navigation Satellite System (Glonass), and so on. GNSS may include at least one of GPS, Glonass, Beidou Navigation Satellite System and Galileo, that is, the European global satellite-based navigation system. Hereinafter, GPS and GNSS may be interchangeably used. The wired communication, for example, may include at least one of universal serial bus (USB), high definition multimedia interface (HDMI), recommended standard 232 (RS-232), plain old telephone service (POTS), and so on. The network 1162 may include telecommunications network, for example, at least one of computer network (for example, LAN or WAN), internet, and telephone network.

Each of the first and second external electronic devices 1102 and 1104 may be the same or different type of the electronic device 1101. The server 1106 may include a group of one or more servers. All or part of operations executed by the electronic device 1101 may be executed by one or more other electronic devices 1102, 1104, or the server 1106. According to an embodiment of the present disclosure, when the electronic device 1101 performs a certain function or service automatically or by a request, the electronic device 1101 may request at least part of a function relating thereto from another device 1102, 1104, or the server 1106 instead of or in addition to executing the function or service by itself. The other electronic device 1102, 1104, or the server 1106 may execute a requested function or an additional function and may deliver an execution result to the electronic device 1101. The electronic device 1101 may provide the requested function or service as it is or by processing the received result additionally. For this, for example, cloud computing, distributed computing, or client-server computing technology may be used.

Figure 12:
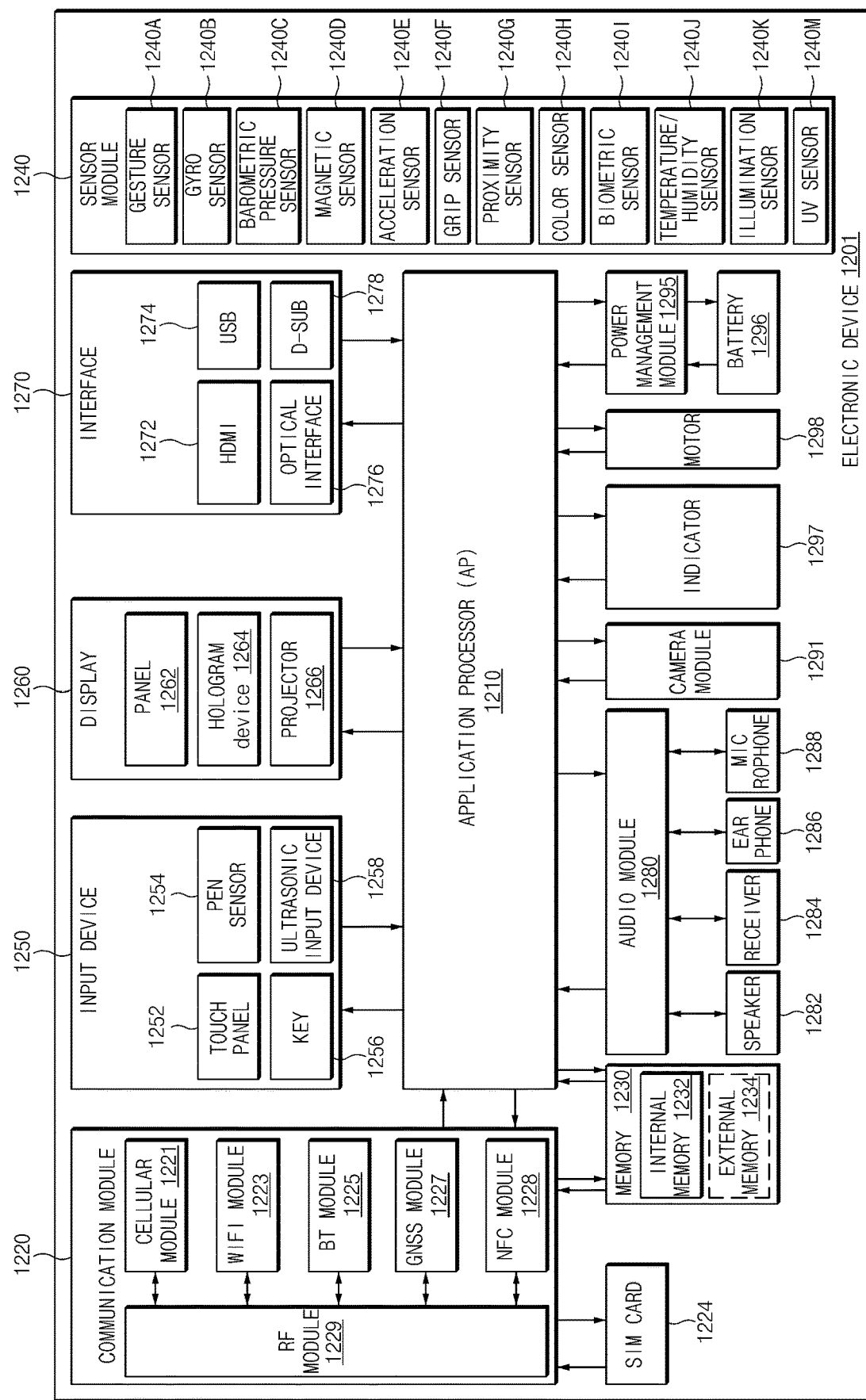
FIG. 12 is a block diagram illustrating an electronic device according to an embodiment of the present disclosure.

FIG. 12 is a block diagram of an electronic device according to an embodiment of the present disclosure. The electronic device 1201, for example, may include all or part of the electronic device 1101 shown in FIG. 11. The electronic device 1201 includes at least one processor 1210 (e.g., an application processor (AP)), a communication module 1220, a subscriber identification module (SIM) card 1224, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may control a plurality of hardware or software components connected thereto and also may perform various data processing and operations by executing an operating system or an application program. The processor 1210 may be implemented with a system on chip (SoC). The processor 1210 may further include a graphic processing unit (GPU) and/or an image signal processor. The processor 1210 may include at least part of components shown in FIG. 12. The processor 1210 may load commands or data received from at least one of other components (e.g., a nonvolatile memory) and process them and store various data in the nonvolatile memory.

The communication module 1220 includes a cellular module 1221, a WiFi module 1223, a BT module 1225, a GNSS module 1227 (for example, a GPS module, a Glonass module, a Beidou module, or a Galileo module), an NFC module 1228, and a radio frequency (RF) module 1229.

The cellular module 1221, for example, may provide voice call, video call, text service, or interne service through communication network. The cellular module 1221 may perform a distinction and authentication operation on the electronic device 1201 in a communication network by using the SIM card 1224. The cellular module 1221 may perform at least part of a function provided by the processor 1210. In the present disclosure, the cellular module 1221 may include a communication processor (CP).

Each of the WiFi module 1223, the BT module 1225, the GPS module 1227, and the NFC module 1228 may include a processor for processing data transmitted/received through a corresponding module. The present disclosure, at least part (e.g., at least one) of the cellular module 1221, the WiFi module 1223, the BT module 1225, the GPS module 1227, and the NFC module 1228 may be included in one integrated chip (IC) or IC package.

The RF module 1229, for example, may transmit/receive communication signals (e.g., RF signals). The RF module 1229 may include a transceiver, a power amp module (PAM), a frequency filter, a low noise amplifier (LNA), or an antenna. At least one of the cellular module 1221, the WiFi module 1223, the BT module 1225, the GNSS module 1227, and the NFC module 1228 may transmit/receive RF signals through a separate RF module.

The SIM 1224 may include a SIM and/or an embedded SIM and also may include unique identification information (e.g., an integrated circuit card identifier (ICCID)) or subscriber information (e.g., an international mobile subscriber identity (IMSI)).

The memory 1230 includes an internal memory 1232 and an external memory 1234. The internal memory 1232 may include at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (for example, NAND flash or NOR flash), hard drive, and a solid state drive (SSD)).

The external memory 1234 may further include flash drive, for example, compact flash (CF), secure digital (SD), micro Micro-SD, Mini-SD, extreme digital (xD), multimedia card (MMC) or a memory stick. The external memory 1234 may be functionally and/or physically connected to the electronic device 1201 through various interfaces.

The sensor module 1240 measures physical quantities or detects an operating state of the electronic device 1201, thereby converting the measured or detected information into electrical signals. The sensor module 1240 may include at least one of a gesture sensor 1240A, a gyro sensor 1240B, a barometric pressure sensor 1240C, a magnetic sensor 1240D, an acceleration sensor 1240E, a grip sensor 1240F, a proximity sensor 1240G, a color sensor 1240H (for example, a red, green, blue (RGB) sensor), a biometric sensor 1240I, a temperature/humidity sensor 1240J, an illumination sensor 1240K, and an ultra violet (UV) sensor 1240M. Additionally or alternatively, the sensor module 1240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit for controlling at least one sensor therein. The electronic device 1201 may further include a processor configured to control the sensor module 1240 as part of or separately from the processor 1210 and thus may control the sensor module 1240 while the processor 1210 is in a sleep state. According to various embodiments of the present disclosure, the biometric sensor 1240I may have the same or similar configuration as the fingerprint sensor 110 of FIG. 1.

The input device 1250 includes a touch panel 1252, a (digital) pen sensor 1254, a key 1256, or an ultrasonic input device 1258. The touch panel 1252 may use at least one of capacitive, resistive, infrared, or ultrasonic methods, for example. Additionally, the touch panel 1252 may further include a control circuit. The touch panel 1252 may further include a tactile layer to provide tactile response to a user.

The (digital) pen sensor 1254 may include a sheet for recognition as part of a touch panel or a separate sheet for recognition. The key 1256 may include a physical button, an optical key, or a keypad. The ultrasonic input device 1258 may detect ultrasonic waves generated from an input tool through the microphone 1288 in order to check data corresponding to the detected ultrasonic waves.

The display 1260 includes a panel 1262, a hologram device 1264, or a projector 1266. The panel 1262 may have the same or similar configuration to the display 1160 of FIG. 11. The panel 1262 may be implemented to be flexible, transparent, or wearable, for example. The panel 1262 and the touch panel 1252 may be configured with one module. The hologram 1264 may show three-dimensional images in the air by using the interference of light. The projector 1266 may display an image by projecting light on a screen. The screen, for example, may be placed inside or outside the electronic device 1201. The display 1260 further includes a control circuit for controlling the panel 1262, the hologram device 1264, or the projector 1266.

The interface 1270 includes a high-definition multimedia interface (HDMI) 1272, a universal serial bus (USB) 1274, an optical interface 1276, or a D-subminiature (sub) 1278. The interface 1270 may be included in the communication interface 1170 shown in FIG. 11. Additionally or alternatively, the interface 1270 may include a mobile high-definition link (MHL) interface, a secure Digital (SD) card/multi-media card (MMC) interface, or an infrared data association (IrDA) standard interface.

The audio module 1280 may convert sound into electrical signals and convert electrical signals into sounds. At least some components of the audio module 1280 may be included in the input/output interface 1150 shown in FIG. 11. The audio module 1280 processes sound information inputted/outputted through a speaker 1282, a receiver 1284, an earphone 1286, or a microphone 1288.

The camera module 1291, which captures still images and video, may include at least one image sensor (e.g., a front sensor or a rear sensor), a lens, an image signal processor (ISP), or a flash (for example, an LED or a xenon lamp).

The power management module 1295 may manage the power of the electronic device 1201. The power management module 1295 may include a power management IC (PMIC), a charger IC, or a battery gauge, for example. The PMIC may have a wired and/or wireless charging method. The wireless charging method may be a magnetic resonance method, a magnetic induction method, or an electromagnetic method. An additional circuit for wireless charging, such as a circuit such as a coil loop, a resonant circuit, or a rectifier circuit, may be added. The battery gauge may measure the remaining amount of the battery 1296, or a voltage, current, or temperature thereof during charging. The battery 1296, for example, may include a rechargeable battery and/or a solar battery.

The indicator 1297 may display a specific state of the electronic device 1201 or part thereof (e.g., the processor 1210), such as a booting state, a message state, or a charging state. The motor 1298 may convert electrical signals into mechanical vibration and may generate vibration or a haptic effect. The electronic device 1201 may include a processing device (e.g., a GPU) for mobile TV support. A processing device for mobile TV support may process media data according to the standards such as digital multimedia broadcasting (DMB), digital video broadcasting (DVB), or media-FLO®.

Each of the above-mentioned components of the electronic device according to embodiments of the present disclosure may be configured with at least one component and the name of a corresponding component may vary according to the kind of an electronic device. An electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

Figure 13:
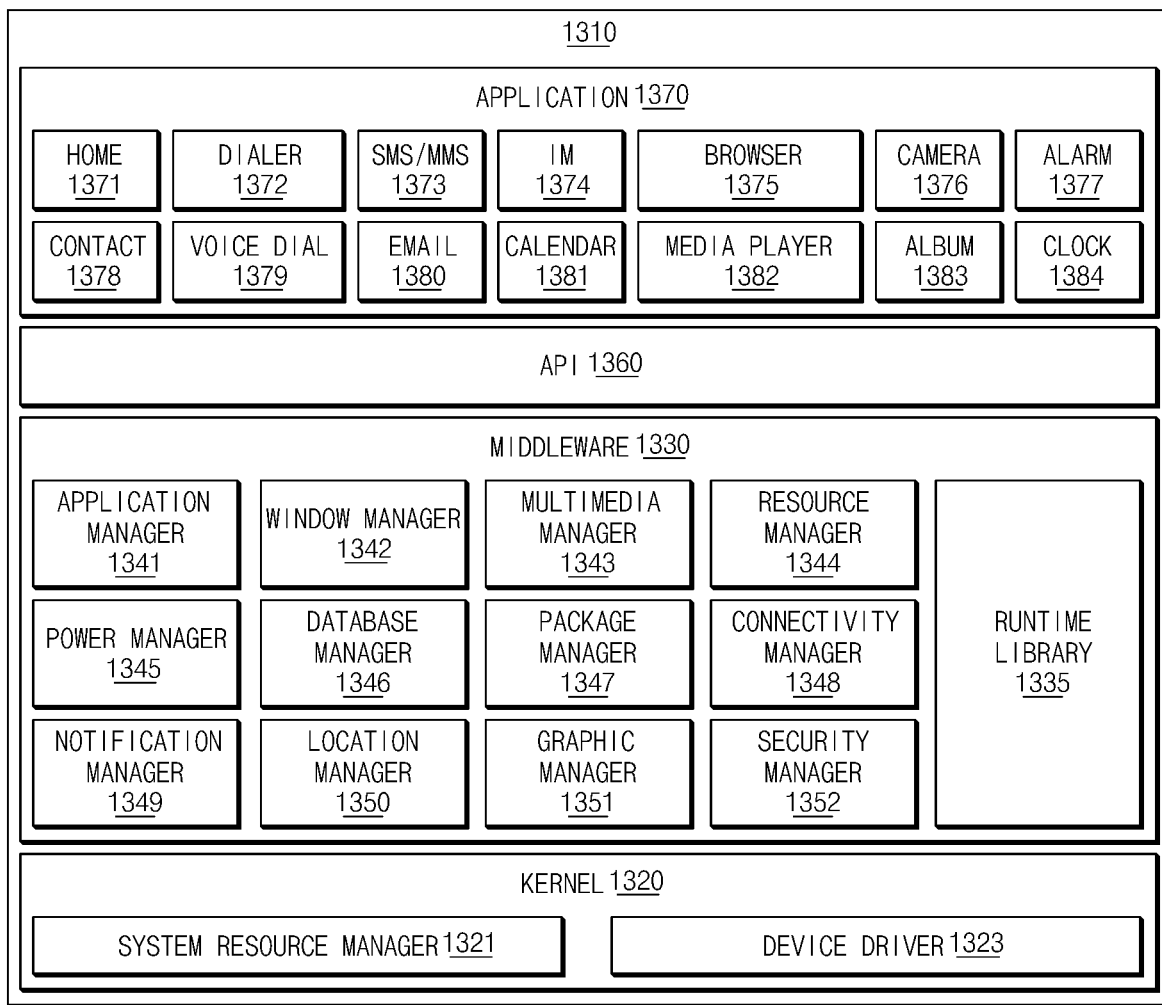
FIG. 13 is a block diagram illustrating a program module according to an embodiment of the present disclosure.

FIG. 13 is a block diagram illustrating a program module according to an embodiment of the present disclosure. The program module 1310 may include an operating system (OS) for controlling a resource relating to an electronic device and/or various applications running on the OS. The OS, for example, may include android, iOS, Windows, Symbian, Tizen, or Bada.

The programs include a kernel 1310, a middleware 1330, an application programming interface (API) 1360, and an application program 1370. At least part of the program module 1310 may be preloaded on an electronic device or may be downloaded from a server.

The kernel 1320 includes a system resource manager 1321, and a device driver 1323. The system resource manager 1321 may perform the control, allocation, or retrieval of a system resource. The system resource manager 1321 may include a process management unit, a memory management unit, or a file system management unit. The device driver 1323, for example, a display driver, a camera driver, a Bluetooth driver, a sharing memory driver, a USB driver, a keypad driver, a WiFi driver, an audio driver, or an inter-process communication (IPC) driver.

The middleware 1330, for example, may provide a function commonly required by the application 1370, or may provide various functions to the application 1370 through the API 1360 in order to allow the application 1370 to efficiently use a limited system resource inside the electronic device. The middleware 1330 includes a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, and a security manager 1352.

The runtime library 1335 may include a library module that a complier uses to add a new function through a programming language while the application 1370 is running. The runtime library 1335 may perform a function on input/output management, memory management, or an arithmetic function.

The application manager 1341 may manage the life cycle of at least one application among the applications 1370. The window manager 1342 may manage a GUI resource used in a screen. The multimedia manager 1343 may recognize a format for playing various media files and may encode or decode a media file by using the codec corresponding to a corresponding format. The resource manager 1344 may manage a resource such as a source code, a memory, or a storage space of at least any one of the applications 1370.

The power manager 1345, for example, may operate together with a basic input/output system (BIOS) to manage the battery or power and may provide power information necessary for an operation of the electronic device. The database manager 1346 may create, search, or modify a database used in at least one application among the applications 1370. The package manager 1347 may manage the installation or update of an application distributed in a package file format.

The connectivity manger 1348 may manage a wireless connection such as WiFi or Bluetooth. The notification manager 1349 may display or notify an event such as arrival messages, appointments, and proximity alerts to a user in a manner of not interrupting the user. The location manager 1350 may manage location information on an electronic device. The graphic manager 1351 may manage a graphic effect to be provided to a user or a user interface relating thereto. The security manager 1352 may provide various security functions necessary for system security or user authentication. When an electronic device includes a phone function, the middleware 1330 may further include a telephony manager for managing a voice or video call function of the electronic device.

The middleware 1330 may include a middleware module for forming a combination of various functions of the above-mentioned components. The middleware 1330 may provide a module specialized for each type of OS to provide differentiated functions. Additionally, the middleware 1330 may delete part of existing components or add new components dynamically.

The API 1360 is a set of API programming functions that may be provided as another configuration according to OS. For example, when using Android or iOS, one API set may be provided for each platform, and when using Tizen, at least two API sets may be provided for each platform.

The application 1370 includes at least one application for providing functions, such as a home 1371, a dialer 1372, an SMS/MMS 1373, an instant message 1374, a browser 1375, a camera 1376, an alarm 1377, a contact 1378, a voice dial 1379, an e-mail 1380, a calendar 1381, a media player 1382, an album 1383, a clock 1384, health care application (e.g., for measuring an exercise amount or blood sugar), or environmental information provision application (e.g., for providing air pressure, humidity, or temperature information).

According to an embodiment of the present disclosure, the application 1370 may include an application (hereinafter referred to as "information exchange application") for supporting information exchange between the electronic device and an external electronic device. The information exchange application, for example, may include a notification relay application for relaying specific information to the external device or a device management application for managing the external electronic device.

For example, the notification relay application may have a function for relaying to an external electronic device notification information occurring from another application (for example, an SMS/MMS application, an e-mail application, a health care application, or an environmental information application) of the electronic device. The notification relay application may also receive notification information from an external electronic device and may then provide the received notification information to a user.

The device management application, for example, may manage (e.g., install, delete, or update) at least one function (turn-on/turn off of the external electronic device itself (or some components) or the brightness (or resolution) adjustment of a display) of an external electronic device communicating with the electronic device, an application operating in the external electronic device, or a service (e.g., call service or message service) provided from the external device.

According to an embodiment of the disclosure, the application 1370 may include a specified application (e.g., a health care application of a mobile medical device) according to at least one property of an external electronic device. The application 1370 may include an application received from an external electronic device. The application 1370 may include a preloaded application or a third party application downloadable from a server. The names of components in the program module 1310 according to the shown embodiment may vary depending on the type of OS.

According to an embodiment of the present disclosure, at least part of the program module 1310 may be implemented with software, firmware, hardware, or a combination thereof. At least part of the programming module 1310 may be implemented (e.g., executed) by a processor. At least part of the programming module 1310 may include a module, a program, a routine, sets of instructions, or a process to perform at least one function, for example.

According to an embodiment of the present disclosure, a fingerprint recognition rate may be improved by providing a method of inputting fingerprint information corresponding to a target area in order to collect fingerprint information corresponding to a target area based on fingerprint information corresponding to a collected reference area during a fingerprint registration process.

Additionally, according to an embodiment of the present disclosure, fingerprint registration may be completed smoothly by combining and providing a swipe method and a touch method as a fingerprint information collecting method.

Additionally, according to an embodiment of the present disclosure, the number of fingerprint registrations may be reduced by displaying at least one of collected fingerprint information and registered fingerprint information and providing a feedback on a fingerprint registration state.

Additionally, according to an embodiment of the present disclosure, the number of fingerprint registrations may be reduced by displaying at least one unregistered fingerprint area in a target area and inducing a user to input fingerprint information corresponding to a corresponding fingerprint area.

The term "module", as used herein, may refer to a unit including a combination of at least one of hardware, software, and firmware. The terms "module", "unit", "logic", "logical block", "component", and "circuit" may be interchangeably used. A module may be a minimum unit or part of an integrally configured component. A module may be a minimum unit performing at least one function or part thereof. A module may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to an embodiment of the present disclosure, at least part of a device (e.g., modules or functions thereof) or a method (e.g., operations) according to this disclosure, for example, as in a form of a programming module, may be implemented using an instruction stored in computer-readable storage media. When at least one processor executes an instruction, it may perform a function corresponding to the instruction. The non-transitory computer-readable storage media may include a memory, for example.

The non-transitory computer-readable storage media may include hard disks, floppy disks, magnetic media (for example, magnetic tape), optical media (for example, compact disc read only memory (CD-ROM), and digital versatile disc (DVD)), magneto-optical media (for example, floptical disk), and hardware devices (for example, read only memory (ROM), random access memory (RAM), or flash memory). A program instruction may include high-level language code executable by a computer using an interpreter in addition to machine code created by a complier. The hardware device may be configured to operate as at least one software module to perform an operation of various embodiments of the present disclosure and vice versa.

A module or a programming module according to an embodiment of the present disclosure may include at least one of the above-mentioned components, may exclude some of the above-mentioned components, or may further include other components. Operations performed by a module, a programming module, or other components according to various embodiments of the present disclosure may be executed through a sequential, parallel, repetitive or heuristic method. Some operations may be executed in a different order or may be omitted. Alternatively, other operations may be added.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display;
a fingerprint sensor configured to sense a user's fingerprint; and
a processor coupled to the fingerprint sensor and configured to perform fingerprint registration by:
obtaining, via the fingerprint sensor, first fingerprint information of a first portion of the user's fingerprint upon the user's fingerprint contacting the fingerprint sensor;
outputting, to the display, a first display object in a center region of a target area for fingerprint registration, in response to obtaining the first fingerprint information of the first portion of the user's fingerprint;
outputting, to the display, a first guiding object, indicating a first adjacent region with respect to the center region of the target area, to guide contact of a second portion of the user's fingerprint that is adjacent to the first portion;
obtaining, via the fingerprint sensor, second fingerprint information upon the user's fingerprint contacting the fingerprint sensor guided by the first guiding object;
in response to obtaining the second fingerprint information, outputting, to the display, a second display object in the first adjacent region with the first display object in the center region of the target area;
outputting, to the display, a second guiding object, indicating a second adjacent region with respect to the center region of the target area, to guide contact of a third portion of the user's fingerprint that is adjacent to the first portion;
obtaining, via the fingerprint sensor, third fingerprint information upon the user's fingerprint contacting the fingerprint sensor guided by the second guiding object;
in response to obtaining the third fingerprint information, outputting, to the display, a third display object in the second adjacent region with the second display object in the first adjacent region and the first display object in the center region of the target area; and
outputting, to the display, a third guiding object, indicating a third adjacent region with respect to the center region of the target area, to guide contact of a fourth portion of the user's fingerprint that is adjacent to the first portion;
obtaining, via the fingerprint sensor, fourth fingerprint information upon the user's fingerprint contacting the fingerprint sensor guided by the third guiding object; and
in response to obtaining the fourth fingerprint information, outputting, to the display, a fourth display object in the third adjacent region with the third display object in the second adjacent region, the second display object in the first adjacent region, and the first display object in the center region of the target area,
wherein the contact of the second portion, the third portion, and the fourth portion of the user's fingerprint is guided in a predetermined order.

2. The electronic device of claim 1, where the predetermined order corresponds to a predetermined direction around the first portion of the user's fingerprint.

3. The electronic device of claim 1, wherein the processor is further configured to perform fingerprint registration by:
determining whether a condition for completing the fingerprint registration is satisfied by the first, second, third, and fourth fingerprint information; and
when the condition is not satisfied, outputting instructions to obtain additional fingerprint information corresponding to at least one portion of the user's fingerprint that is required to satisfy the condition, and obtain the additional fingerprint information via the fingerprint sensor.

4. The electronic device of claim 1, wherein the processor is further configured to perform fingerprint registration by outputting voice information corresponding to at least one of the first, second, and third guiding objects through a voice output device.

5. The electronic device of claim 1, wherein the first, second, and third guiding objects instruct a user to move a finger in a specified direction based on the first portion.

6. The electronic device of claim 1, wherein the first, second, and third guiding objects guide with respect to an unregistered portion of the user's fingerprint in the target area.

7. The electronic device of claim 1, wherein the first adjacent region corresponds to a left side region with respect to the center region of the target area, the second adjacent region corresponds to an upper side region with respect to the center region of the target area, and the third adjacent region corresponds to a right side region with respect to the center region of the target area.

8. The electronic device of claim 1, wherein the first adjacent region, the second adjacent region, and the third adjacent region are disposed in at least one of a clockwise direction or a counter-clockwise direction with respect to the center region of the target area.

9. A fingerprint information processing method of an electronic device, the method comprising:

obtaining, via a fingerprint sensor of the electronic device, first fingerprint information of a first portion of the user's fingerprint upon the user's fingerprint contacting the fingerprint sensor;

outputting, to a display of the electronic device, a first display object in a center region of a target area for fingerprint registration, in response to obtaining the fingerprint information of the first portion of the user's fingerprint;

outputting, to the display, a first guiding object, indicating a first adjacent region with respect to the center region of the target area, to guide contact of a second portion of the user's fingerprint that is adjacent to the first portion;

obtaining, via the fingerprint sensor, second fingerprint information upon the user's fingerprint contacting the fingerprint sensor guided by the first guiding object;

in response to obtaining the second fingerprint information, outputting, to the display, a second display object in the first adjacent region with the first display object in the center region of the target area;

outputting, to the display, a second guiding object, indicating a second adjacent region with respect to the center region of the target area, to guide contact of a third portion of the user's fingerprint that is adjacent to the first portion;

obtaining, via the fingerprint sensor, third fingerprint information upon the user's fingerprint contacting the fingerprint sensor guided by the second guiding object;

in response to obtaining the third fingerprint information, outputting, to the display, a third display object in the second adjacent region with the second display object in the first adjacent region and the first display object in the center region of the target area; and outputting, to the display, a third guiding object, indicating a third adjacent region with respect to the center region of the target area, to guide contact of a fourth portion of the user's fingerprint that is adjacent to the first portion;

obtaining, via the fingerprint sensor, fourth fingerprint information upon the user's fingerprint contacting the fingerprint sensor guided by the third guiding object; and in response to obtaining the fourth fingerprint information, outputting, to the display, a fourth display object in the third adjacent region with the third display object in the second adjacent region, the second display object in the first adjacent region, and the first display object in the center region of the target area, wherein the contact of the second portion, the third portion, and the fourth portion of the user's fingerprint is guided in a predetermined order at least partially around the first portion of the user's fingerprint.

10. The method of claim 9, wherein the predetermined order corresponds to a predetermined direction around the first portion of the user's fingerprint.

11. The method of claim 9, further comprising:

determining whether a condition for completing the fingerprint registration is satisfied by the first, second, third, and fourth fingerprint information; and when the condition is not satisfied, outputting instructions to obtain additional fingerprint information corresponding to at least one portion of the user's fingerprint that is required to satisfy the condition, and obtain the additional fingerprint information via the fingerprint sensor.

12. The method of claim 9, further comprising outputting voice information corresponding to at least one of the first, second, and third guiding objects through a voice output device.

13. The method of claim 9, wherein the first, second, and third guiding objects instruct a user to move a finger in a specified direction based on the first portion.

14. The method of claim 9, wherein the first, second, and third guiding objects guide with respect to an unregistered portion of the user's fingerprint in the target area.

15. The method of claim 9, wherein the first adjacent region corresponds to a left side region with respect to the center region of the target area, the second adjacent region corresponds to an upper side region with respect to the center region of the target area, and the third adjacent region corresponds to a right side region with respect to the center region of the target area.

16. The method of claim, 9, wherein the first adjacent region, the second adjacent region, and the third adjacent region are disposed in at least one of a clockwise direction or a counter-clockwise direction with respect to the center region of the target area.

* * * * *